(12) United States Patent  (10) Patent No.: US 8,468,460 B2
Mysliwy et al.  (45) Date of Patent: Jun. 18, 2013

(54) SYSTEM AND METHOD FOR DISPLAYING, NAVIGATING AND SELECTING ELECTRONICALLY STORED CONTENT ON A MULTIFUNCTION HANDHELD DEVICE

(75) Inventors: Brian P. Mysliwy, Tonawanda, NY (US); Donald W. Stucke, Jr., East Aurora, NY (US); Kathleen E. Kremer, Snyder, NY (US); William J. McCormick, Hamburg, NY (US); Ellen K. Donahue, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 124 days.

(21) Appl. No.: 12/948,862

(22) Filed: Nov. 18, 2010

(65) Prior Publication Data

US 2011/0060988 A1 Mar. 10, 2011

Related U.S. Application Data

(63) Continuation of application No. PCT/US2010/048253, filed on Sep. 9, 2010.

(60) Provisional application No. 61/240,765, filed on Sep. 9, 2009.

(51) Int. Cl.
*G06F 3/048* (2006.01)

(52) U.S. Cl.
USPC ........... 715/764; 715/702; 715/762; 715/763; 715/726; 715/835; 715/845; 715/846

(58) Field of Classification Search
USPC .................................. 715/702, 764
See application file for complete search history.

(56) References Cited

U.S. PATENT DOCUMENTS

| | | | |
|---|---|---|---|
| 5,379,057 A | 1/1995 | Clough et al. | |
| 5,428,805 A | 6/1995 | Morgan | |
| 5,485,176 A | 1/1996 | Ohara et al. | |
| 5,544,295 A | 8/1996 | Capps | |

(Continued)

FOREIGN PATENT DOCUMENTS

| | | | |
|---|---|---|---|
| KR | 20080046518 A | 5/2008 | |
| KR | 20080088090 A | 10/2008 | |
| KR | 20090077597 A | 7/2009 | |

OTHER PUBLICATIONS

Int'l Search Report dated Apr. 29, 2011 in PCT/US2010/048253, 11 pages.

*Primary Examiner* — Omar Abdul-Ali
*Assistant Examiner* — Sherrod Keaton
(74) *Attorney, Agent, or Firm* — Panitch Schwarze Belisario & Nadel LLP

(57) ABSTRACT

A method for navigating among activity programs in the memory of a portable handheld multifunction electronic system. Simultaneously displaying on contact-sensitive display a plurality of category icons and a subcategory icon associated with a currently selected subcategory, each category icon having a link to one or more activity programs. If a category has been selected, replacing the plurality of displayed category icons with one or more activity program icons, each of the one or more displayed activity program icons corresponding to a separate one of the activity programs belonging to the selected category and to the currently selected subcategory. If another subcategory has been selected, at least changing the link of each separate displayed category icon to a different one or more activity programs, the different one or more activity program being associated the another subcategory and with each category of the category icons being displayed.

32 Claims, 17 Drawing Sheets

U.S. PATENT DOCUMENTS

| | | | |
|---|---|---|---|
| 5,670,992 | A | 9/1997 | Yasuhara et al. |
| 5,675,362 | A | 10/1997 | Clough et al. |
| 5,681,170 | A | 10/1997 | Rieber et al. |
| 5,823,782 | A | 10/1998 | Marcus et al. |
| 5,825,353 | A | 10/1998 | Will |
| 5,956,048 | A | 9/1999 | Gaston |
| 6,005,545 | A | 12/1999 | Nishida et al. |
| 6,068,487 | A | 5/2000 | Dionne |
| 6,244,960 | B1 | 6/2001 | Takasaka et al. |
| 6,305,942 | B1 | 10/2001 | Block et al. |
| 6,319,010 | B1 | 11/2001 | Kikinis |
| 6,544,126 | B2 | 4/2003 | Sawano et al. |
| 6,572,378 | B1 | 6/2003 | Rehkemper et al. |
| 6,632,094 | B1 | 10/2003 | Falcon et al. |
| 6,639,584 | B1 | 10/2003 | Li |
| 6,652,283 | B1 | 11/2003 | Van Schaack et al. |
| 6,669,479 | B1 | 12/2003 | Jenkins |
| 6,690,354 | B2 | 2/2004 | Sze |
| 6,793,129 | B2 | 9/2004 | Wood et al. |
| 6,801,751 | B1 | 10/2004 | Wood et al. |
| 6,875,021 | B2 | 4/2005 | Okamoto |
| 6,918,833 | B2 | 7/2005 | Emmerson et al. |
| 6,920,619 | B1 | 7/2005 | Milekic |
| 6,966,837 | B1 | 11/2005 | Best |
| 7,083,420 | B2 | 8/2006 | Wood et al. |
| 7,145,554 | B2 | 12/2006 | Bachmann |
| 7,193,609 | B2 | 3/2007 | Lira |
| 7,249,950 | B2 | 7/2007 | Freeman et al. |
| 7,257,528 | B1 | 8/2007 | Ritchie et al. |
| 7,309,287 | B2 | 12/2007 | Miyamoto et al. |
| 7,331,868 | B2 | 2/2008 | Beaulieu et al. |
| 7,366,995 | B2 | 4/2008 | Montague |
| 7,371,163 | B1 | 5/2008 | Best |
| 7,374,490 | B2 | 5/2008 | Tahara et al. |
| 7,400,908 | B2 | 7/2008 | Lehtonen |
| 8,006,198 | B2 * | 8/2011 | Okuma et al. ............... 715/810 |
| 2002/0183112 | A1 | 12/2002 | Emmerson et al. |
| 2003/0052787 | A1 * | 3/2003 | Zerhusen et al. ......... 340/573.1 |
| 2003/0218637 | A1 | 11/2003 | Sloo et al. |
| 2004/0008191 | A1 | 1/2004 | Poupyrev et al. |
| 2004/0206809 | A1 | 10/2004 | Wood et al. |
| 2004/0214146 | A1 | 10/2004 | Harris et al. |
| 2005/0037327 | A1 | 2/2005 | Wood et al. |
| 2005/0114776 | A1 | 5/2005 | Wood et al. |
| 2005/0142527 | A1 | 6/2005 | Yeh |
| 2005/0216834 | A1 * | 9/2005 | Gu ............................... 715/522 |
| 2006/0040737 | A1 | 2/2006 | Comair |
| 2006/0097991 | A1 | 5/2006 | Hotelling et al. |
| 2006/0181518 | A1 | 8/2006 | Shen et al. |
| 2006/0188860 | A1 | 8/2006 | Morrison |
| 2006/0189385 | A1 | 8/2006 | Nakajima et al. |
| 2007/0035616 | A1 | 2/2007 | Lee et al. |
| 2007/0077541 | A1 | 4/2007 | Champagne et al. |
| 2007/0157089 | A1 | 7/2007 | Van Os et al. |
| 2007/0157103 | A1 | 7/2007 | Arneson et al. |
| 2007/0180978 | A1 | 8/2007 | Ozaki et al. |
| 2007/0265081 | A1 | 11/2007 | Shimura et al. |
| 2007/0265082 | A1 | 11/2007 | Shimura et al. |
| 2007/0265083 | A1 | 11/2007 | Ikebata et al. |
| 2007/0271528 | A1 | 11/2007 | Park et al. |
| 2008/0048991 | A1 | 2/2008 | Freeman et al. |
| 2008/0174570 | A1 | 7/2008 | Jobs et al. |
| 2008/0307339 | A1 * | 12/2008 | Boro et al. ................... 715/764 |
| 2009/0183100 | A1 | 7/2009 | Eom et al. |

* cited by examiner

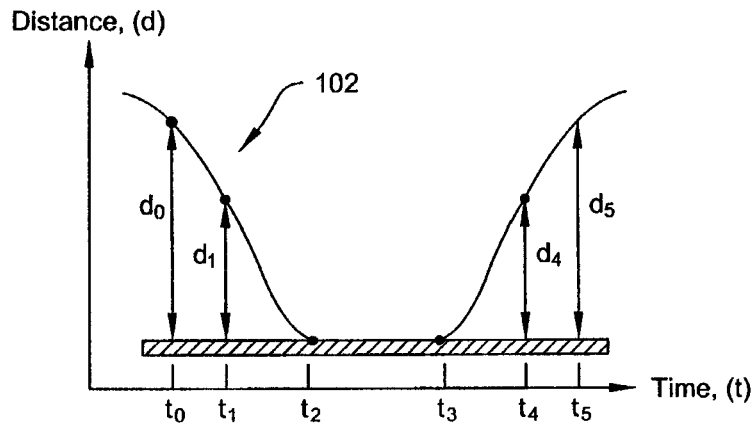

*Fig. 6A*

| Time, t | Trigger Event |
|---|---|
| $t < t_1$ | Object at distance ($d_1 < d < d_0$) moves toward surface of touch screen and is beyond an in-range threshold distance ($d_1$) for detection |
| $t_1 ? t < t_2$ | Object is detectable, but not in contact with surface of touch screen; distance from surface is decreasing |
| $t = t_2$ | Object makes initial contact (touch down) with surface of touch screen |
| $t_2 ? t < t_3$ | Object remains in contact with touch screen for a dwell time $t_d = t_3 - t_2$ |
| $t = t_3$ | Object breaks contact (lift-off) with surface |
| $t_3 < t ? t_4$ | Object is detectable, but not in contact with surface of touch screen; distance from surface is increasing |
| $t > t_4$ | Object at distance ($d_4 < d < d_5$) moves away from surface of touch screen and is beyond an in-range threshold distance ($d_1$) for detection |

SYSTEM AND METHOD FOR DISPLAYING, NAVIGATING AND SELECTING ELECTRONICALLY STORED CONTENT ON A MULTIFUNCTION HANDHELD DEVICE

CROSS-REFERENCE TO RELATED APPLICATIONS

This application is a continuation of International Patent Application No. PCT/US2010/048253, with an international filing date of Sep. 9, 2010, designating the United States and filed in the English language, which International Patent Application, in turn, claims the benefit of U.S. Provisional Patent Application No. 61/240,765, filed Sep. 9, 2009. Each of the above-identified related applications is incorporated herein by reference.

BACKGROUND OF THE INVENTION

The present invention relates to system and method for displaying, navigating and selecting electronically stored content on a multifunction handheld device. More particularly, the present invention relates to a method for navigating among activities stored in processor readable memory of an electronic edutainment device having processor in electrical communication with a contact-sensitive display and the memory.

Multifunction handheld electronic devices typically have a form factor driven by the desire to have the devices be as small and light as possible. Accordingly, such devices, whether they are used for business, education, or entertainment, have relatively small electronic displays and in most instance a plurality of related applications stored in memory such as contacts, calendars, to-do lists, spread sheets and the like in the business world; reading and writing programs in the education world, and various games with common characters or themes in the entertainment world.

The size of the menus of selectable content that must be presented to the user before an activity may be selected and launched generally exceeds the viewable area of the typical display screen on multifunction handheld electronic devices. In desk-top systems such as work stations and personal computers, the displays are large enough to allow the user to navigate among the content using cascading drop-down menus that remain on the screen as the user proceeds from level to level of the taxonomic scheme for organizing the relationship among content elements or programs. This approach is not adaptable to the small screen size of the displays on handheld devices.

Accordingly, there is a need in the art for a system and method for displaying, navigating and selecting electronically stored content on a multifunction handheld device having a small contact-sensitive display.

BRIEF SUMMARY OF THE INVENTION

Briefly stated, one aspect of the invention is directed to a method for navigating among a number of activity programs electronically stored in processor readable memory of a portable handheld multifunction electronic system having at least a main processor in electrical communication with the memory and with a contact-sensitive display, comprising the steps of: simultaneously displaying a plurality of category icons and a subcategory icon on the contact-sensitive display, each separate category icon of the plurality of category icons associated with one separate category of a plurality of categories, the subcategory icon associated with a currently selected subcategory, each separate category icon having a link to one or more activity programs of the number of activity programs, the one or more activity programs being linked to each subcategory icon also being associated the currently selected subcategory; determining whether one or more contracts with the contact-sensitive display represents a user selection of a first selected category corresponding to a first selected category icon of the plurality of displayed category icons, or a user selection of another subcategory corresponding to another displayed subcategory icon, and, in response, if the first selected category has been selected, replacing the first plurality of displayed category icons with a display of one or more activity program icons, each of the one or more displayed activity program icons corresponding to a separate one of the activity programs belonging to the first selected category and to the currently selected subcategory, or if another subcategory has been selected, at least changing the link of each separate displayed category icon to a different one or more activity programs of the number of activity programs, the different one or more activity program being associated the another subcategory and with each category of the category icons being displayed.

Another aspect of the present invention is directed to a method for navigating among a number of activity programs electronically stored in processor readable memory of a portable handheld multifunction electronic system having at least a main processor in electrical communication with the memory and with a contact-sensitive display, each of the activity programs being associated with a separate one of a first set of categories such that each category of the first set is associated with one or more of the number of activity programs, each of the activity programs further being associated with a separate one of a second set of subcategories such that each subcategory of the second set is associated with one or more of the number of activity programs, each subcategory further being associated with one or more of the categories such that each subcategory of the second set belongs to one or more of the categories of the first set, each category of the first set includes one or more of the subcategories of the second set, and each activity program of the number of activity programs belonging to only one subcategory of the second set and only one category of the first set. The method comprising the steps of: simultaneously displaying a first plurality of category icons, at least one subcategory icon and a home icon, the first plurality of category icons and the at least one subcategory icon being displayed on the contact-sensitive display, the home icon being displayed on the contact-sensitive display or on a first button switch in electrical communication with the processor, each displayed subcategory icon corresponding to a separate one of the subcategories of the second set, each of the displayed category icons corresponding to a separate one of the categories of the first set that includes the at least one subcategory corresponding to the at least one subcategory icon, the home icon being associated with a home screen comprising a currently selected subcategory icon and each category icon corresponding to a separate one of the categories of the first set that includes the currently selected subcategory icon; determining whether one or more contracts with the contact-sensitive display or the first button switch represents as a first selection a selection of one selected subcategory different from the at least one subcategory corresponding to the at least one displayed subcategory icon or a selection of one selected category corresponding to a selected display icon of the plurality of displayed category icons or the selection of the home screen; if the one selected category has been selected, replacing the first plurality of displayed category icons with a display of one or more activity program icons, each of the one or more displayed activity program icons corresponding to a separate one of the activity programs belonging to the one selected category and to the at least one subcategory, or if the one selected subcategory has been selected, (a) changing the at least one displayed subcategory icon to another at least one displayed subcategory icon corresponding to the one selected subcategory and (b) changing the subcategory represented by the first plurality of displayed category icons to the one selected subcategory such that each of the first plurality of displayed category icons representing a separate category of the first set further represents a collection of the activity programs belonging to the one selected subcategory of the displayed category, or if the home screen has been selected, displaying the home screen on the contact-sensitive display; determining whether a first another one or more contacts with the contact-sensitive display or the first button switch represents a first another selection of the separate one activity program corresponding to a selected activity program icon of the one or more activity program icons being displayed on the contact-sensitive display, or a first another selection of one selected subcategory different from the at least one subcategory corresponding to the at least one displayed subcategory icon or a first another selection of the home screen; if the separate one activity program has been selected, executing by the main processor the separate one activity program, or if the home screen has been selected, displaying the home screen for the currently selected subcategory on the contact-sensitive display, or if the different subcategory has been selected (a) changing the at least one displayed subcategory icon to another at least one displayed subcategory icon corresponding to the different subcategory and (b) changing the one or more activity program icons being displayed on the contact-sensitive display to a display of a different one or more activity program icons each of the different one or more displayed activity program icons corresponding to a separate one of the activity programs belonging to the one selected category and to the another at least one displayed subcategory; determining whether a second another one or more contacts with the contact-sensitive display or the first button switch represents a second another selection of the home screen; and if the home screen is selected, displaying the home screen for the currently selected subcategory on the contact-sensitive display, otherwise, continuing execution of the activity program of the executing step or displaying the activity icons belonging to the currently selected subcategory and the one category to which the activity program of the executing step belongs.

Another aspect of the present invention is directed to a method for navigating among activities stored in processor readable memory of an electronic edutainment device having a processor in electrical communication with a contact-sensitive display and the memory. The method comprises the steps of: simultaneously displaying a first directory of application icons corresponding to one or more applications comprising one or more of the edutainment activities having at least one theme, at lease one theme icon of a second directory of theme icons corresponding to one or more themes including the at lease one theme and a home icon, the first directory of application icons and the at lease one theme icon of a second directory of theme icons being displayed on the contact-sensitive display, the home icon being displayed on the contact-sensitive display or on a first button switch in electrical communication with the processor, the home icon being associated with a home screen; determining whether one or more contracts with the contact-sensitive display or the home button represents as a first selected icon a selection of one of the application icons of the first directory or a selection of another theme icon of the second directory, the another theme icon corresponding to a different theme than the at lease one theme; replacing the first directory with a third directory if one of the application icons has been selected, the third directory comprising one or more activity icons corresponding to the one or more edutainment activities associated with the application corresponding to the first selected icon; or changing the theme of the applications represented by the application icons in the first directory to another theme or changing the activities represented by the activity icons in the third directory to other activities having the another theme, if the another theme icon has been selected; or determining whether a first another one or more contracts with the contact-sensitive display represents as a second selected icon a selection of one of the edutainment activity icons, or a selection of another theme icon of the second directory, the another theme icon corresponding to a different theme than the at lease one theme; and if an edutainment activity icon has been selected, initiating execution of the corresponding edutainment activity; or if a different theme has been selected, changing the edutainment activities represented by the activity icons in the third directory to other edutainment activities corresponding to the different theme; determining whether a second another one or more contracts with the contact-sensitive display or the first button switch represents as a third selected icon a selection of the home icon; and if the home icon is selected, displaying the home screen for the at least one theme associated with the edutainment activity of the initiating execution step, otherwise, continue executing the edutainment activity of the initiating execution step or displaying as the third directory the activity icons displayed immediately prior to the initiating execution step.

BRIEF DESCRIPTION OF THE SEVERAL
VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

Figure 1:
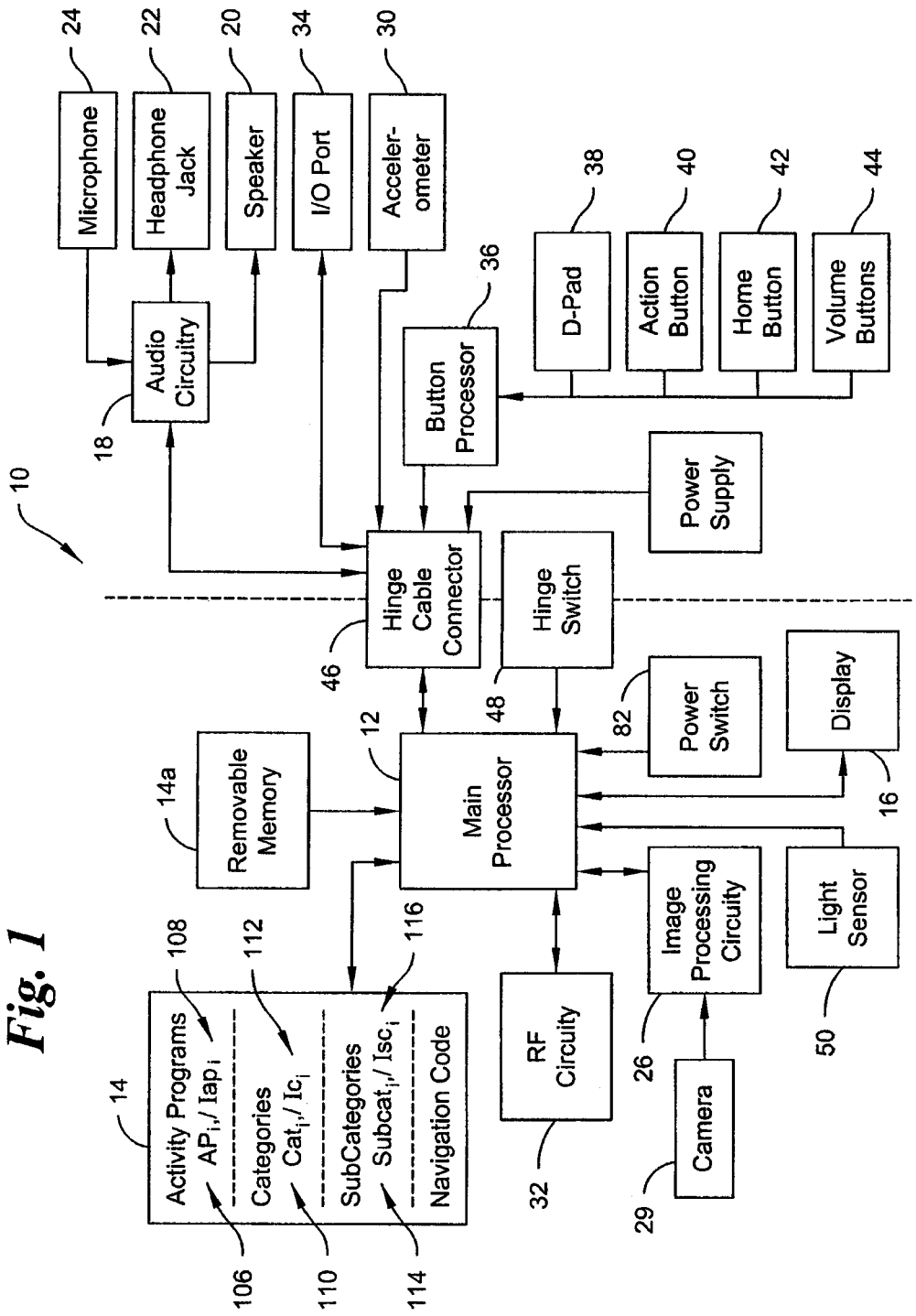
FIG. 1 is a schematic block diagram of an embodiment of the system and method for displaying, navigating and selecting electronically stored content on a handheld multifunction electronic system in accordance with the present invention.
Figure 2:
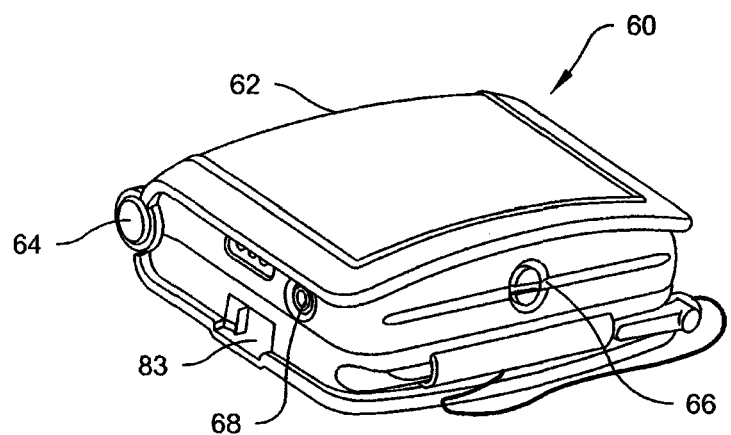
FIG. 2 is a top perspective view of an embodiment of a handheld multifunction electronic system implementing, in part, the schematic of FIG. 1 in accordance with the present invention.
Figure 7:
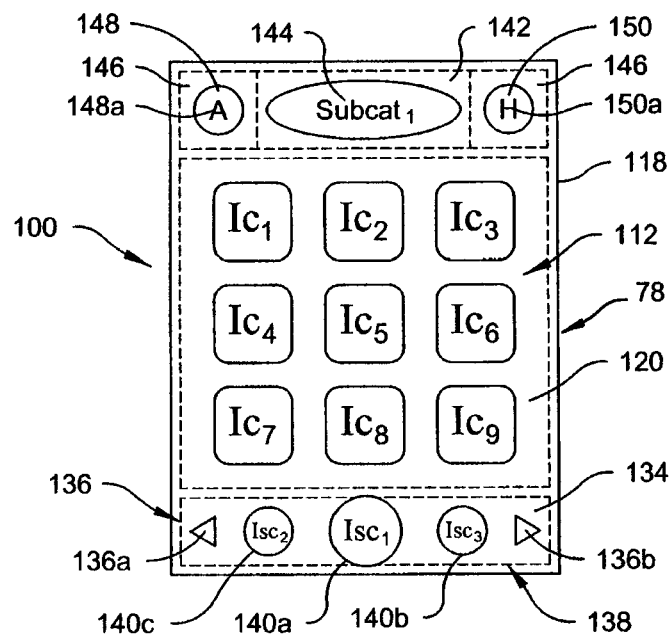
Figure 8A:
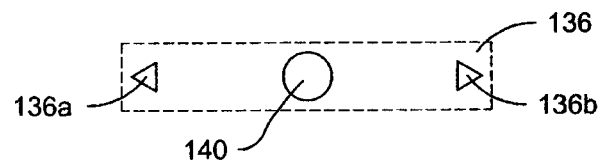
Figure 8B:
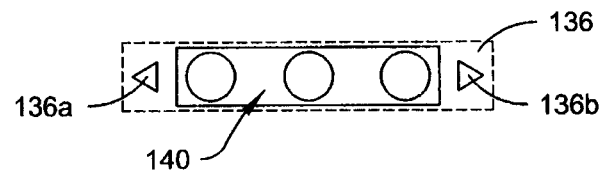
Figure 9:
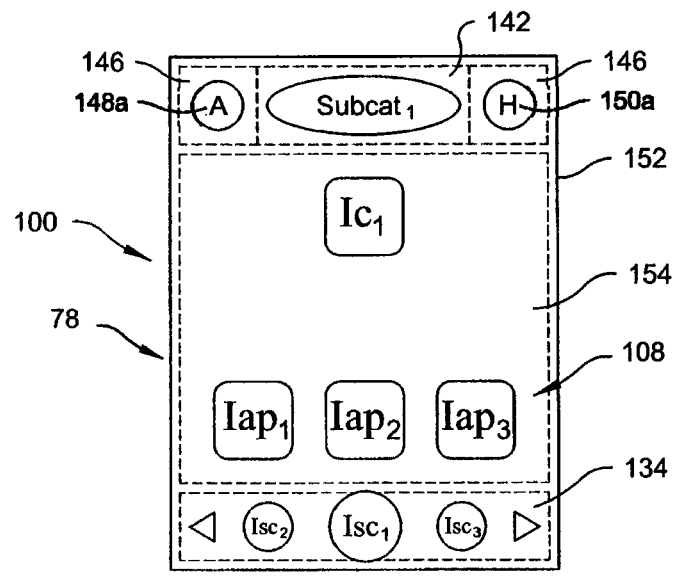
Figure 10:
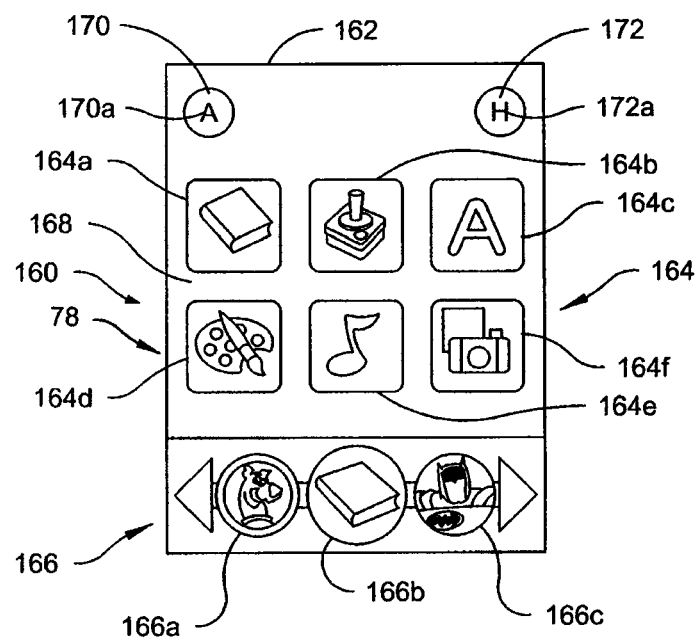
Figure 11:
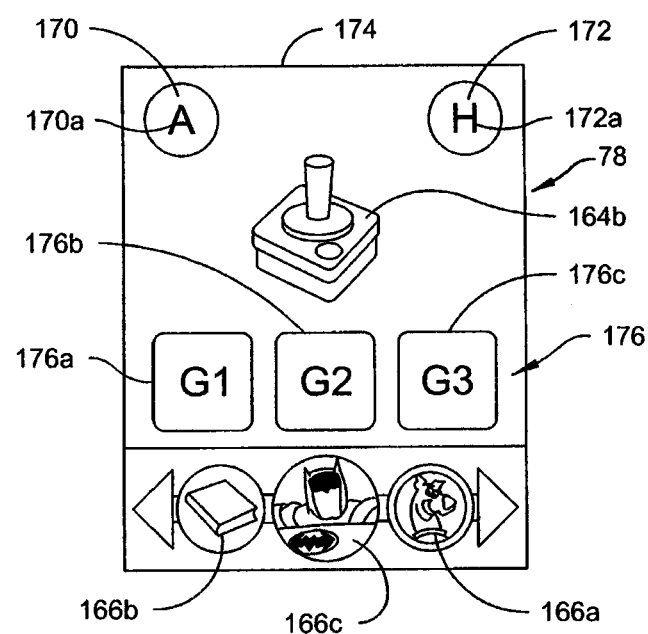
Figure 12:
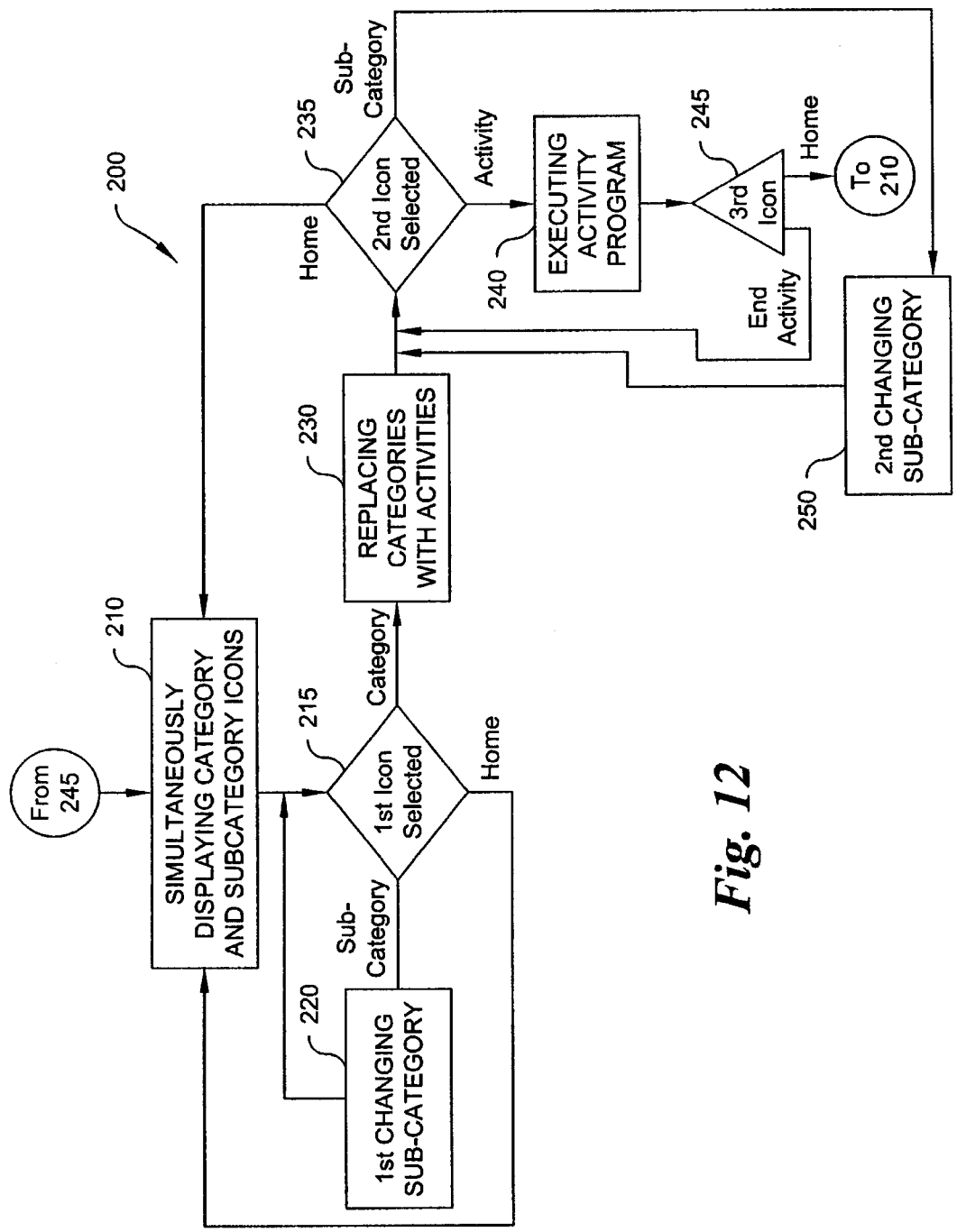
Figure 13:
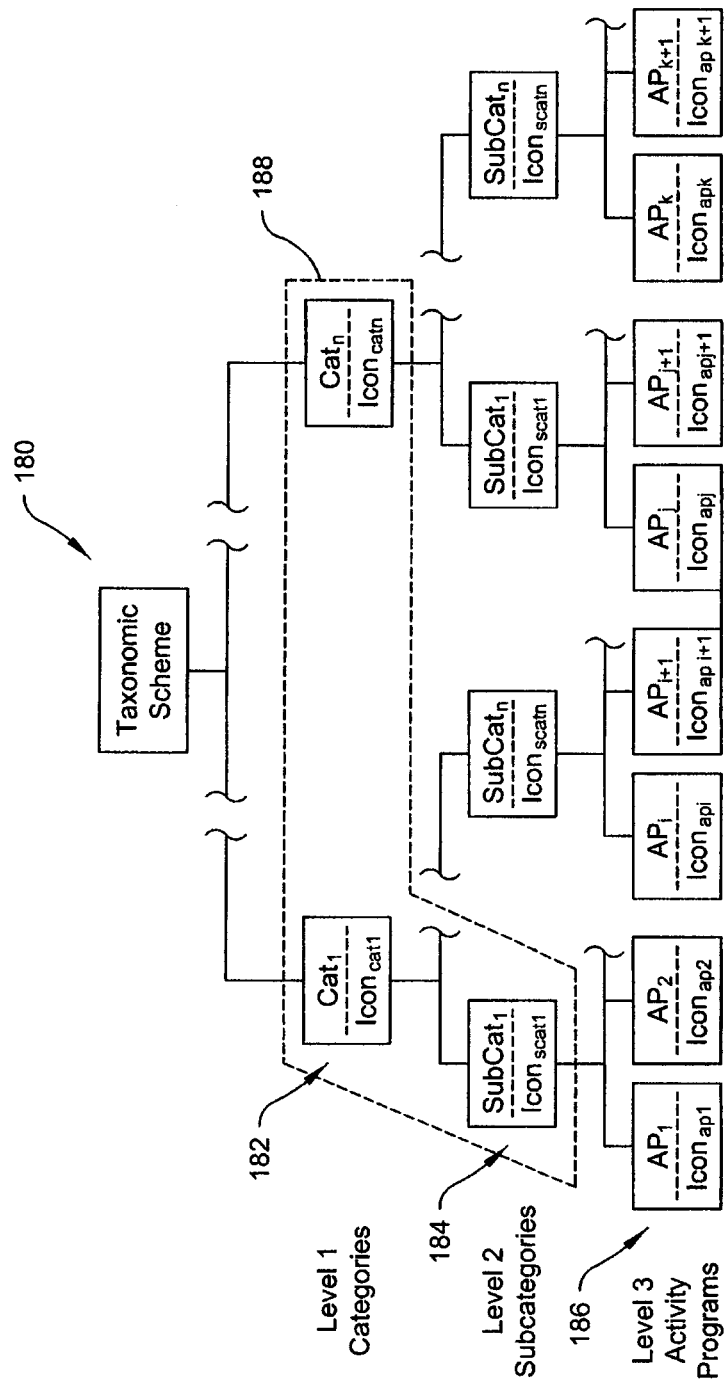
Figure 14:
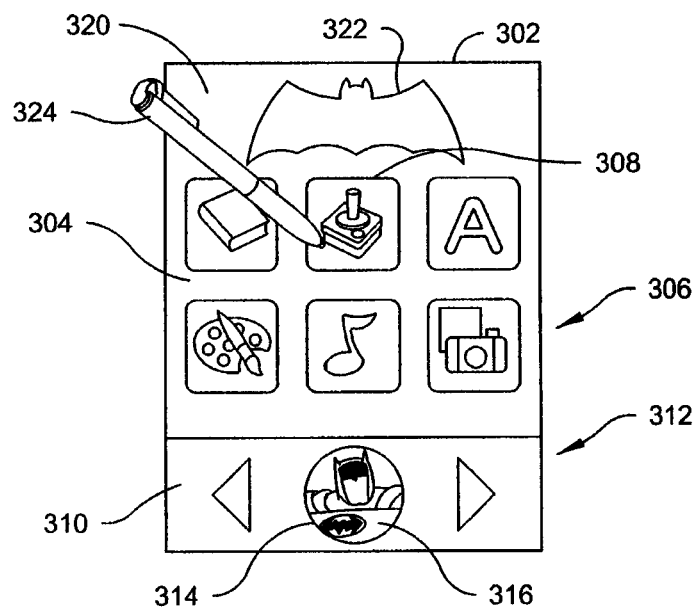
Figure 15:
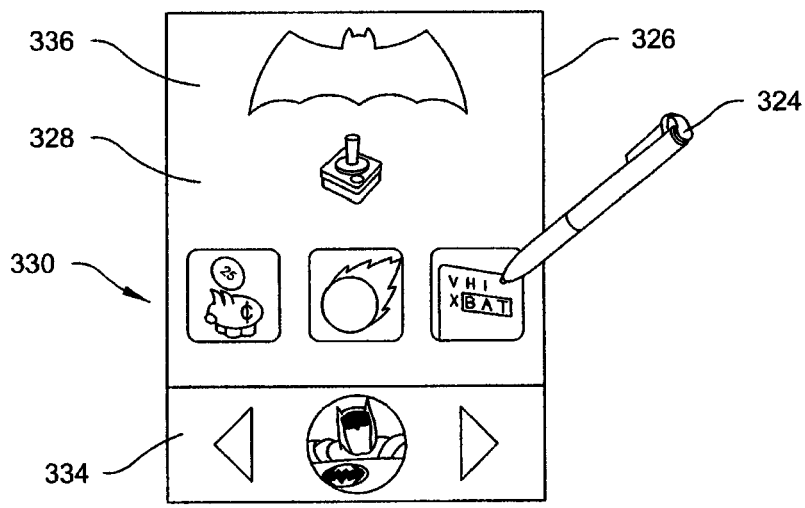
Figure 16:
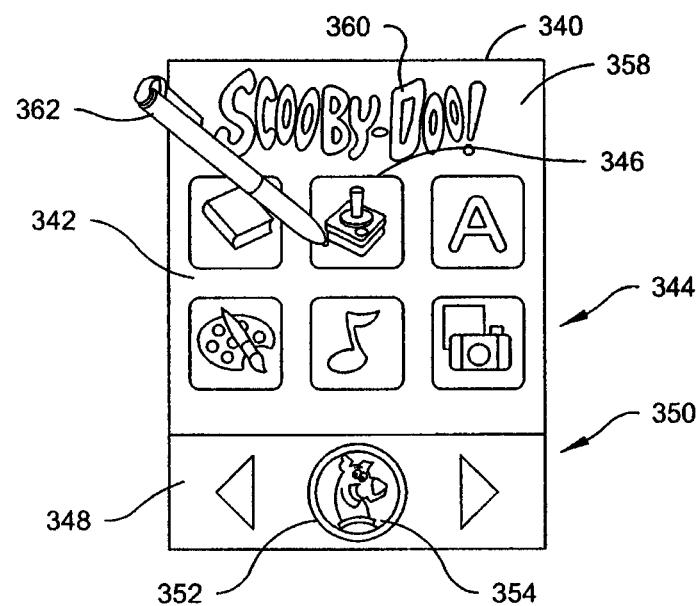
Figure 17:
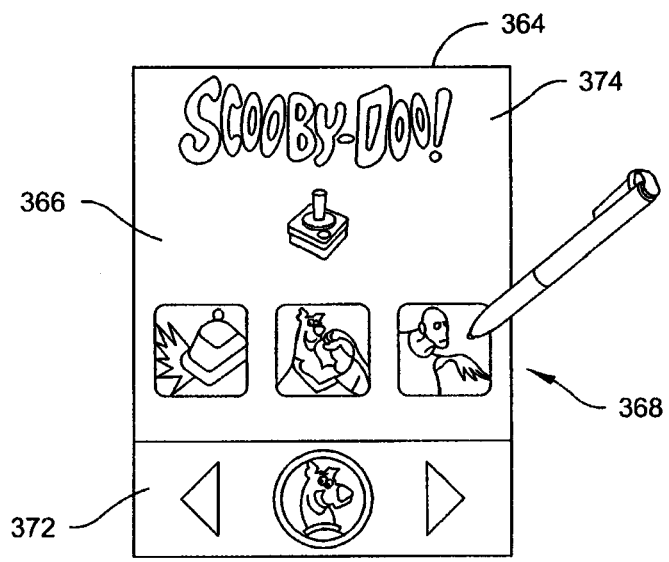
Figure 18:
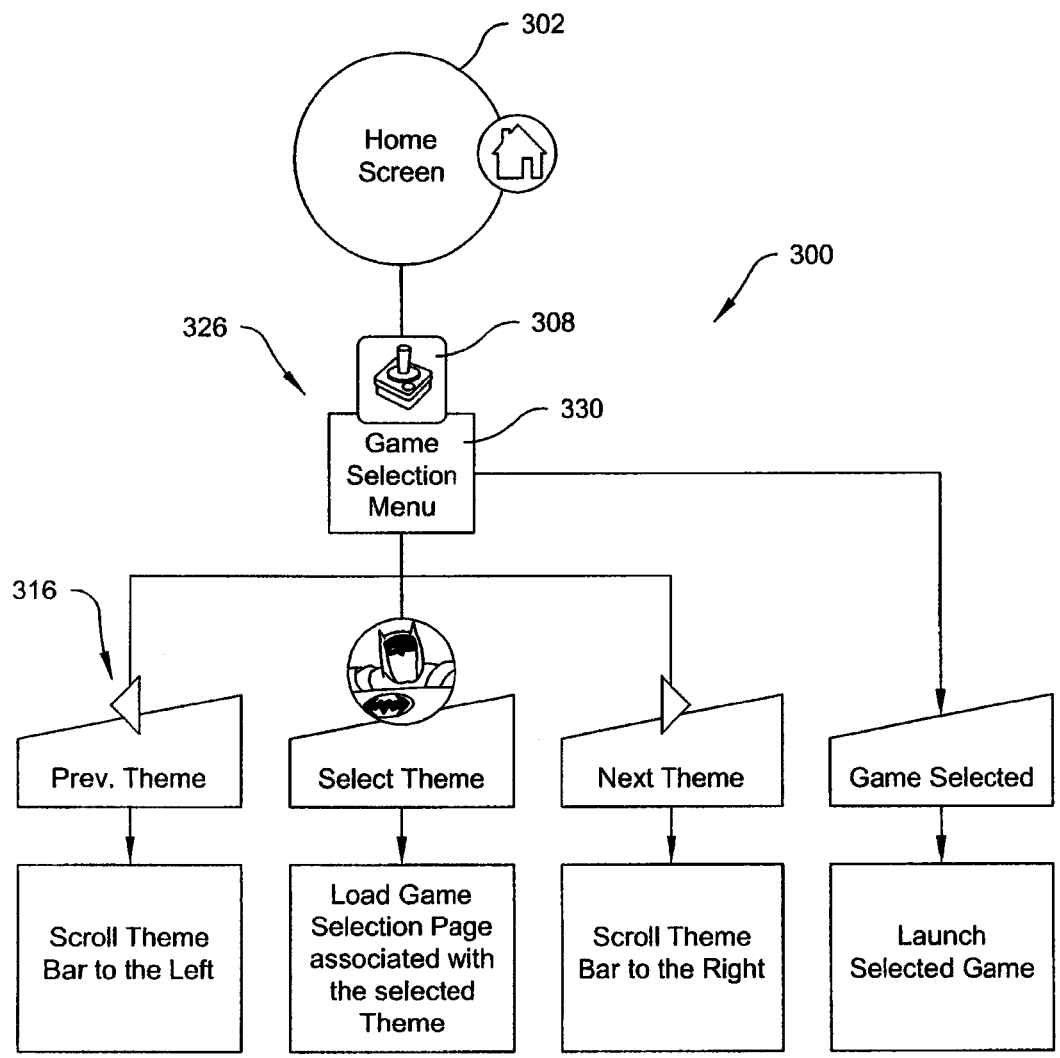

FIGS. 6A and 6B, respectively, are a diagram of a timeline and a table of trigger events for making contact with the contact-sensitive display of FIG. 1 in accordance with the present invention;

FIG. 7 is a diagram of an embodiment of a user interface for the contact-sensitive display of the electronic system of FIG. 1;

FIGS. 8A and 8b are diagrams of alternative embodiments of the scroll bar of FIG. 7;

FIG. 9 is a diagram of another embodiment of a user interface for the contact-sensitive display of the electronic system of FIG. 1;

FIG. 10 is a diagram of another embodiment of a user interface for the contact-sensitive display of the electronic system of FIG. 2;

FIG. 11 is a diagram of another embodiment of a user interface for the contact-sensitive display of the electronic system of FIG. 2;

FIG. 12 is a functional flow diagram of a preferred embodiment of a navigation program for the electronic system of FIG. 1;

FIG. 13 is a diagram of a taxonomic scheme for an embodiment of the activity programs for the electronic system of FIG. 1;

FIG. 14 is a diagram of an embodiment of a home screen for the electronic system of FIG. 2, showing a directory of applications associated with a Batman theme;

FIG. 15 is a diagram of an embodiment of an application screen for the electronic system of FIG. 2, showing a directory of activity programs associated with a Batman theme;

FIG. 16 is a diagram of an embodiment of a home screen for the electronic system of FIG. 2, showing a directory of applications associated with a Scooby-Doo™ theme;

FIG. 17 is a diagram of an embodiment of an application screen for the electronic system of FIG. 2, showing a directory of activity programs associated with a Scooby-Doo™ them;

FIG. 18 is a diagram of a part of one embodiment of the navigation program directed to the Batman theme for the electronic system of FIG. 2

Figure 19:
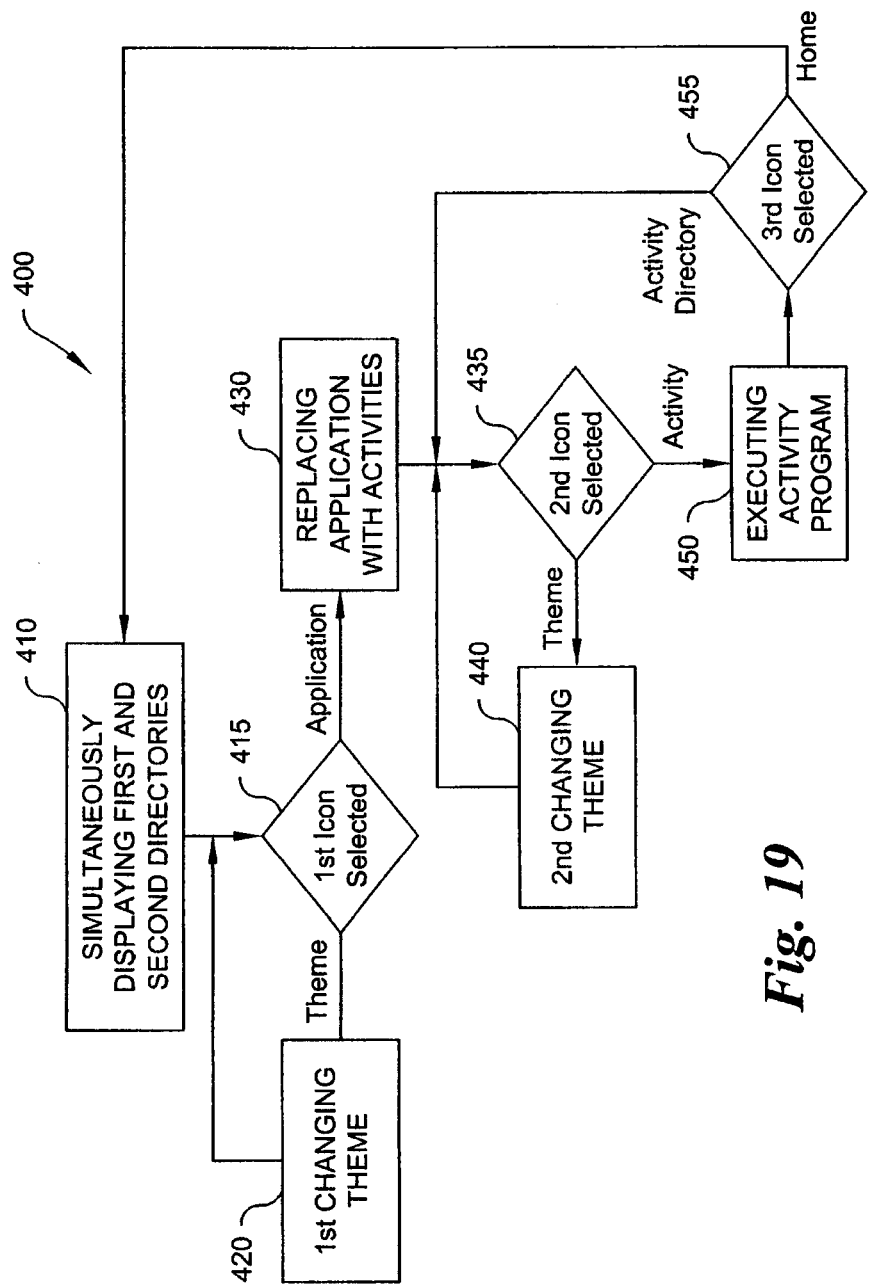

FIG. 19 is a functional flow diagram for another embodiment of the navigation program for the electronic system of FIG. 2.

Figure 20:
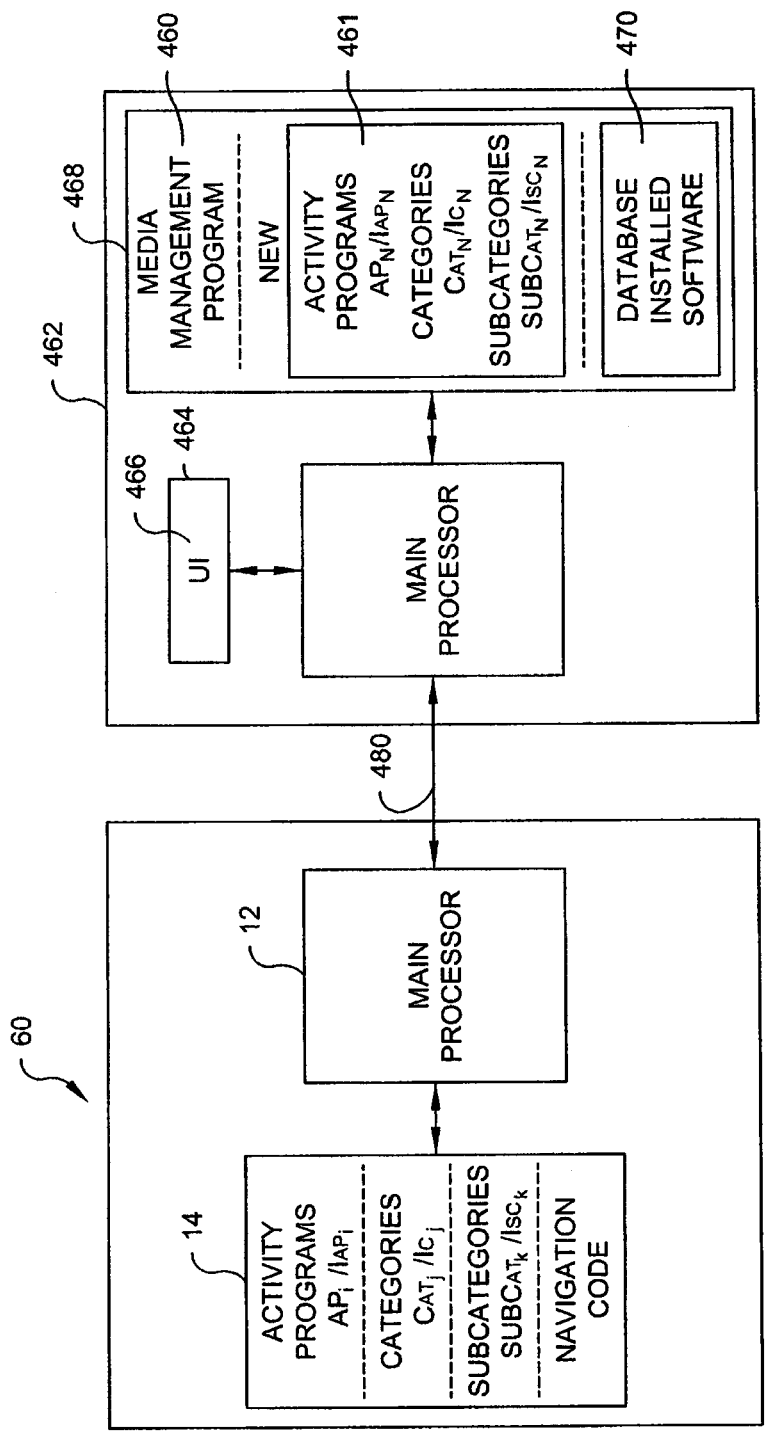

FIG. 20 is a block diagram of another embodiment of the electronic system of FIG. 1 including another electronic device with a media management program stored in memory.

Figure 21:
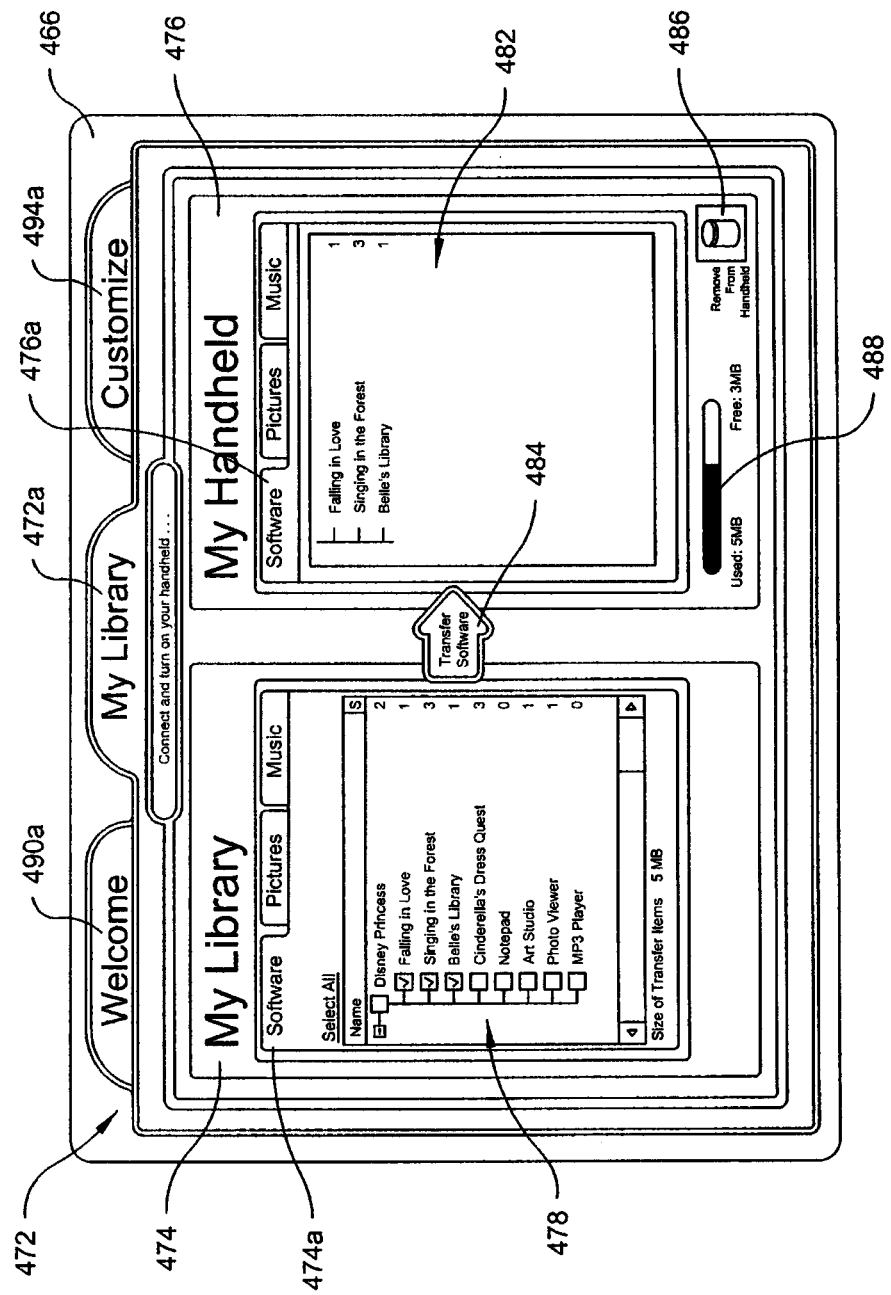
Figure 22:
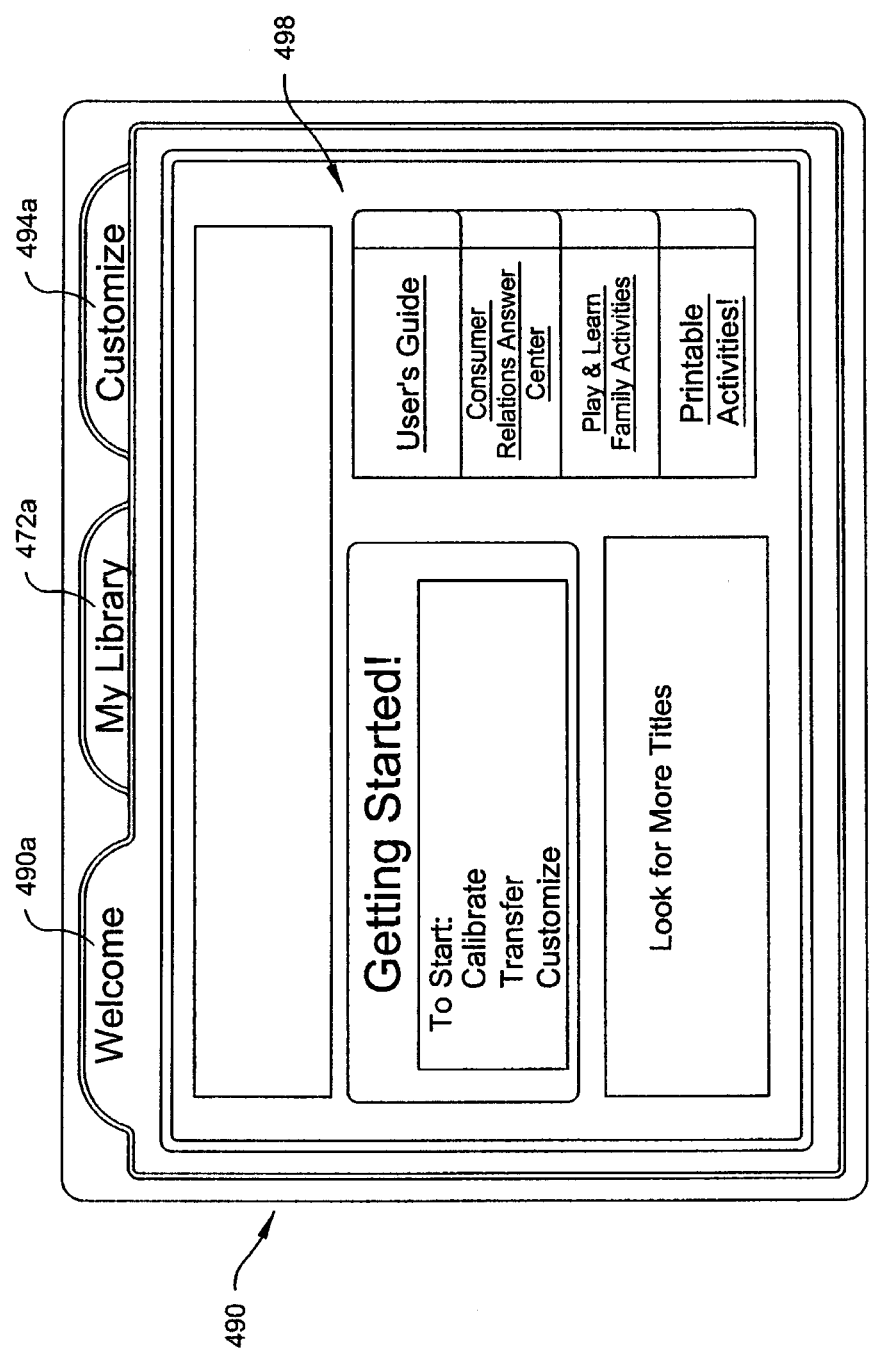
Figure 23:
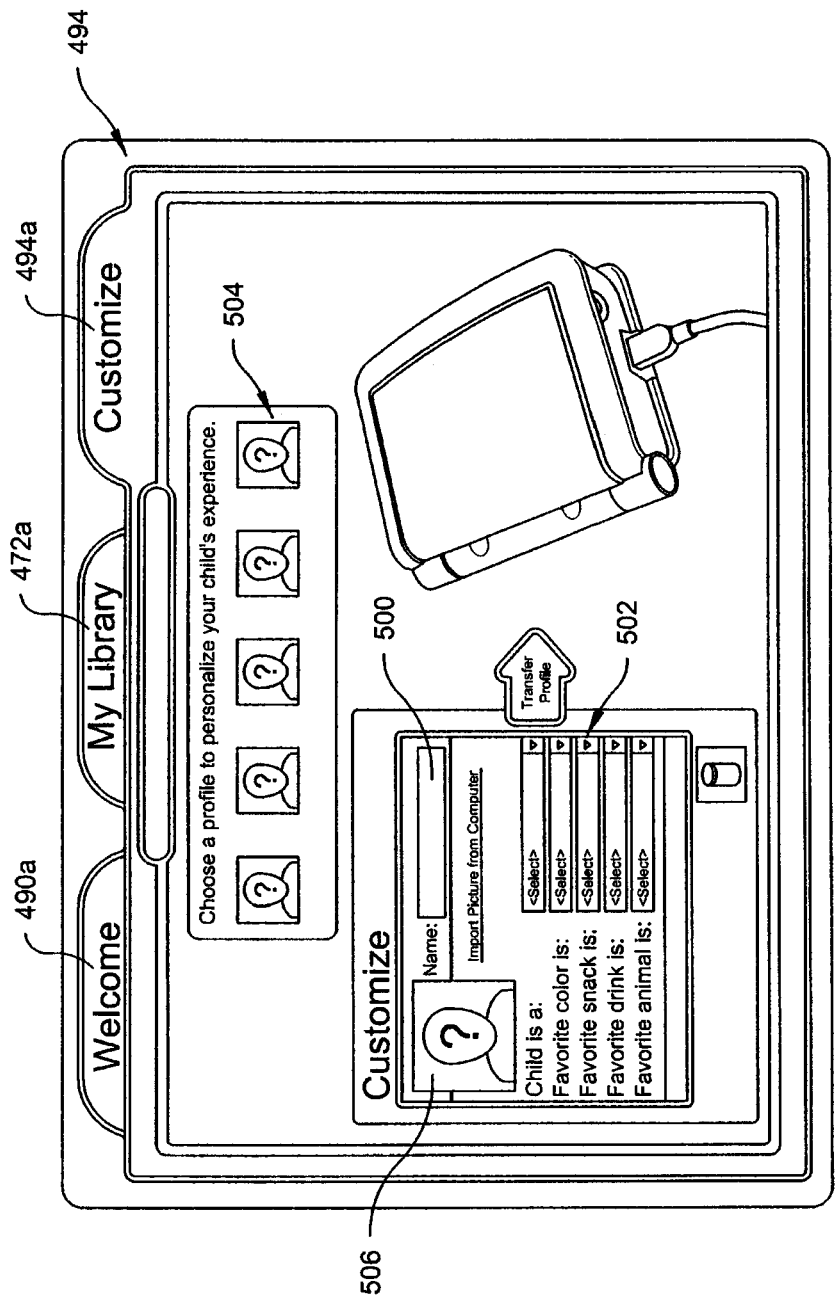

FIG. 21 is a diagram of the My Library screen generated by the media management program for the electronic system of FIG. 20;

FIG. 22 is a diagram of the Welcome screen generated by the media management program for the electronic system of FIG. 20; and FIG. 23 is a diagram of the Customize screen generated by the media management program for the electronic system of FIG. 20.

DETAILED DESCRIPTION OF THE INVENTION

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of electronic learning device, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first set could be termed a second set, and, similarly, a second set could be termed a first set, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a system and method for displaying, navigating and selecting electronically stored content.

Referring to the drawings in detail, where like numerals indicate like elements throughout, there is shown in FIG. 1 a block diagram of a preferred embodiment of the portable handheld multifunction electronic system, generally designated 10, and hereinafter referred to as the "multifunction system" 10 in accordance with the present invention.

The multifunction system 10 comprises at least a main processor 12 in electrical communication with a processor readable memory 14 and with a contact-sensitive display 16. The main processor 12 may comprise one or more central processing units and additional dedicated controllers for special functions such as image processing, audio processing, display interfacing, and button processing. The processor readable memory 14 may comprise any combination of readily available memory such as high-speed random access memory, non-volatile memory, solid-state memory, such as flash memory, internal and external memory devices, and removable memory 14a, such as one or more magnetic disk storage devices or digital memory cards. The contact-sensitive display 16, also referred to as a touch-screen, may be resistive or capacitive, or electromechanical or entirely electrical or transmissive so that in addition to direct contact it may be able to sense near contact (proximity) as further discussed below. A light sensor 50 may be provided to sense the ambient light and provide a signal to the main processor 12 for adjusting the illumination intensity for the touch-screen backplane.

The multifunction system 10 may additionally have audio circuitry 18 in electrical communication with the main processor 12, a speaker 20, a headphone jack 22 and a microphone 24. Some embodiments may additionally include one or more of the following features: image processing circuitry 26 connected to a digital camera 28, accelerometers 30, radio frequency circuitry 32 for wireless communication, and an input/output port, such as a Universal Serial Bus (USB) or an IEEE 1394 (FireWire™) interface port 34.

In addition to the touch screen 16, in some embodiments one or more physical buttons are provided on the housing for the multifunction system 10. In such embodiments, the system electronics may include a button processor 36 for interfacing one or more of the following buttons with the main processor 12: a directional control pad 38 for multi-directional cursor control, an action button 40, a home button 42 and audio volume buttons 44. The functionality of these buttons is further discussed below.

In embodiments of the multifunction system having a hinged housing such as a clam shell-like housing (FIGS. 2-3), a hinge cable connector 46 and hinge switch 48 are provided to link the electronics on one side of the hinge with electronics on the other side of the hinge. The hinge switch 48 is typically configured to deactivate the electronics if the housing is closed with the power On.

The multifunction system 10 is only one example of a portable handheld multifunction electronic system. The multifunction system 10 may have more or fewer components, may combine two or more components, or may have a different configuration or arrangement of the components. The various components shown in FIG. 1 may be implemented in hardware, software or a combination of both hardware and software.

Figure 3:
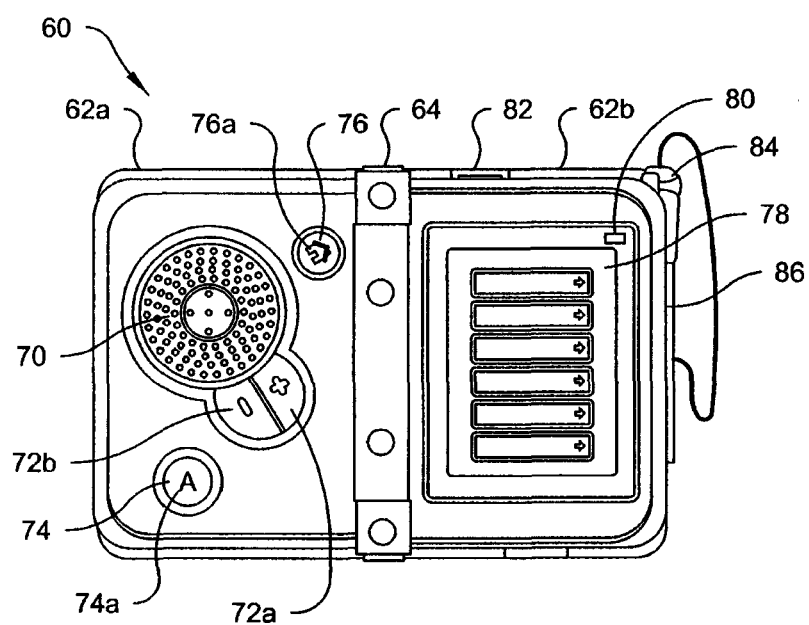
FIG. 3 is a plan view of the electronic system of FIG. 2 in an open portrait orientation.
Figure 4:
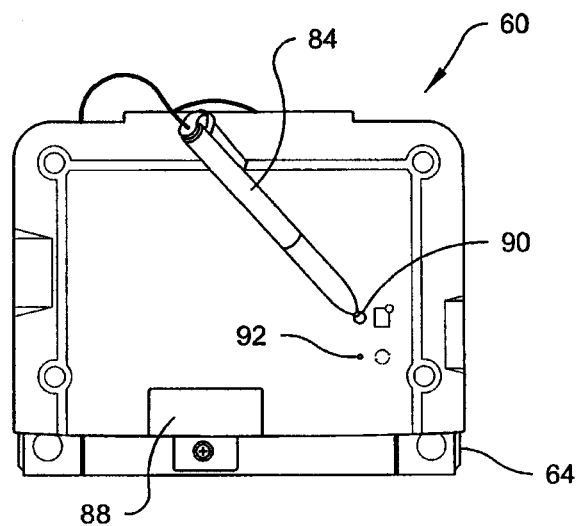
FIG. 4 is a plan view of the bottom of the electronic system of FIG. 2 in the closed position.

Referring to FIGS. 2-4, another preferred embodiment of the portable handheld multifunction electronic system, generally designated 60, and hereinafter referred to as the "multifunction system" 60 in accordance with the present invention is shown. Although the content (programs and data) stored in the processor readable memory 14, 14*a* may be different, the multifunction system 60 has substantially the same electronics as shown in the block diagram for the multifunctional system 10 (see FIG. 1). The electronics are housed in a clamshell-like housing 62 shown in the closed position in FIG. 2 and in an open, portrait orientation in FIG. 3. In portrait orientation, the housing 62 has a first (or left) side 62*a* connected to a second (or right) side 62*b* by a hinge 64.

The left side 62*a* houses a battery compartment 66, a headphone jack 68, and a speaker 70 with raise and lower volume control buttons 72*a*, 72*b*. The left side 62*a* also supports an action button 74 bearing an action icon 74*a* and a home button 76 bearing a home icon 76*a* the functions of which are discussed below.

The right side 62*b* of the housing has a touch-screen 78. A light sensor 80 is provided to sense the ambient light and provide a signal to the main processor 12 (see FIG. 1) for adjusting the illumination intensity for the touch-screen backplane. The right side 62*b* also has a power On/Off switch 82 and a USB port 83. A tethered stylus 84 removably retained in a stylus slot 86 is attached to the right side 62*b*. The backside (or outwardly facing side of the right side 62*b* when the clamshell housing is in the closed position) provides an access to a memory slot 88 for a secure digital memory card (not shown), a touch-screen calibration button 90 and a reset button 92.

Figure 5:
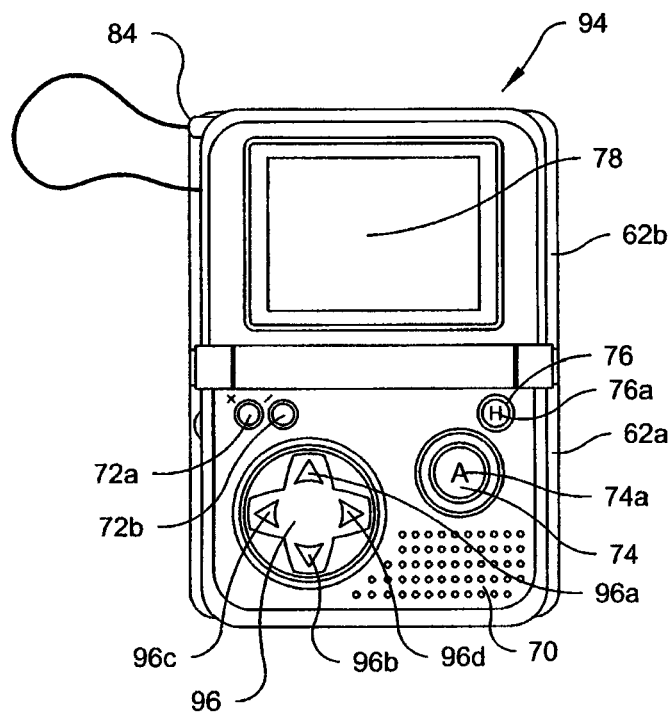
FIG. 5 is a plan view of another embodiment of a handheld multifunction electronic system in an open landscape orientation implementing, in part, the schematic of FIG. 1 in accordance with the present invention.

Referring to FIG. 5, another preferred embodiment of the portable handheld multifunction electronic system, generally designated 94, and hereinafter referred to as the "multifunction system" 94 in accordance with the present invention is shown in landscape orientation. The multifunction system 94 has substantially the same electronics as the multifunctional system 60 and additionally has a directional control pad 96 with up 96*a*, down 96*b*, left 96*c* and right 96*d* switches for controlling the movement of a cursor or other object on the touch-screen 78 a. Touch-Screen Interfaces

The touch-screen 78 provides both an output and an input interface between the user and the many possible embodiments of the portable handheld multifunction systems disclosed herein. The output interface is a visual display that may present to the user any combination of visually perceptible objects such as text, icons, and images, collectively referred to as graphics. The graphics may be displayed statically (e.g., picture-like) or dynamically (e.g., as an animation or video). The input interface is a touch-sensitive surface, sensor or arrangement of sensors that accepts input from the user based on tactile or near-tactile contact by an object, such as a stylus, or by a user appendage, such as a finger.

In some embodiments, the touch-screen interface is designed to be responsive primarily to stylus-based contacts, in general, and, more specifically, to one or more points of contact, stylus traces during contact and the pressure applied to the touch-screen surface during contact. In other embodiments, the touch-screen interface is designed to be responsive primarily to finger-based contacts and gestures.

In still other embodiments, the touch-screen is designed to be responsive to contact with a wide variety of objects varying in shape and compliance. One class of such objects includes sphere-like objects having smooth curved surfaces such that contact with a touch-screen surface occurs at a tangent point. Another class of objects is faceted objects having one or more generally planar surfaces, such as polyhedrons, in which contact is distributed over a surface area. Still another class of objects has irregular surfaces that result in concurrent multiple points or areas of contact.

Prior art literature is replete with analyses and algorithms characterizing and modeling contact between planar surfaces and various objects, generally, and more specifically, between the surface of touch-screens and styluses or fingers. For brevity, the system and method of the present invention is described below using a stylus or finger as the object in contact or near contact with a touch-screen. However, the disclosure is not intended to be limiting. The system and method of the present invention are equally applicable to a wide range of objects and can be readily adapted to incorporate prior art algorithms characterizing the nature of specific contacts.

For example, since the area on a touch-screen in contact with a stylus-tip is generally smaller than the area in contact with a finger-tip, in general, finger-based input is less precise than stylus-based input. Accordingly, in some embodiments in which the touch-screen is designed for finger-based input, well known centroiding and offsetting algorithms or instructions may be implemented to transform an area of finger-contact into a precise location on the touch-screen and to properly associate a user's finger gesture with a corresponding user-desired input (e.g., the selection or movement of an object, such as a button or a slider, on the touch-screen).

FIGS. 3 and 5 illustrate a touch-screen 78 in accordance with some embodiments of the present invention. The touch-screen may display one or more graphics with a preferred embodiment of a user interface, generally designated 100, and hereafter referred to as the "UI" 100 in accordance with the present invention. (see FIG. 7). In the UI 100, as well as other embodiments described below, a user may select one or more of the graphics by making near contact with or touching the graphics, for example, with a stylus or finger.

A representative timeline 102 for making contact with a touch-screen is shown in FIG. 6A. Each trigger event 104 (FIG. 6B) may be associated with a different executable command (or instruction set). For example, a graphic on the touch-screen may change in various ways (e.g., size, shape, color, intensity, be animated or not-animated, with or without an accompanying sound effect) as an object approaches the touch-screen, makes contact with or is in contact with the touch-screen, breaks contact with the touch-screen and moves away from the touch-screen.

In some embodiments of the UI 100, the graphic may initially appear on the touch-screen at a first intensity when the object is beyond an in-range threshold distance for detection, (e.g., t<t1). The graphic intensity may flash at a constant rate when the object is detectable, but not in contact with surface of touch-screen (e.g., t1≦t<t2). The flash rate may increase as the object moves progressively closer to the surface. When the object contacts the surface (t=t2), the graphic may have a second constant intensity greater than the first intensity. Flashing may occur again when the object breaks contact with the touch-screen, decreasing in flash rate as the object moves further away form the touch-screen.

In other embodiments of the UI 100, a zoom function may be associated with the approach of an object. The graphic may increase or decrease in size as a function of the distance of the object from the surface of the touch-screen. For example a zoom-in may occur as the object approaches the surface and a zoom-out may occur as the object moves away from the surface.

In some embodiments of the UI 100, a touch-screen parameter other than the distance, (e.g., pressure applied by the object to the touch-screen, or dwell time of contact with the touch-screen) may trigger the above described events.

All trigger events need not occur. The object may never make contact with the surface. Alternatively, the object may remain in contact with the surface and not be removed for a substantial period of time.

The graphic on the touch-screen may function as a button or switch and may, upon activation by the occurrence of one of the aforementioned trigger events, cause a processor, such as the processor 12 (see FIG. 1) to initiate or terminate any executable instruction set or command stored in memory and associated with the graphic.

b. Physical Buttons

One or more physical buttons, such as the home (or menu) button 76 or the action (or trigger) button 74 or the directional control buttons 96, 96a-d may be provided in some embodiments (see FIGS. 3 and 5). The home button 76 may be used to navigate to a touch-screen view (or scene) displaying a set of applications (discussed below) that may be executed on the multifunction system 10, 60, 94 or to an activity within the set of applications. The action button 74 may be used to trigger the initiation of an event in an activity, the termination of an ongoing event, or to select a graphic proximal to the position of a stylus in contact with the touch-screen.

The directional control buttons may be an arrangement of individual buttons or an assembly comprising the arrangement of buttons 96a-d, such as a directional control pad (or D-pad) 96, that may be used to control the direction of movement of a touch-screen scene (such as scrolling) or the movement of an object in the scene.

Alternatively, in some embodiments, separate physical buttons or an arrangement of buttons may be implemented as a soft key or graphic appearing on the touch-screen or one or more physical buttons my adjoin the touch-screen and be identified by icons displayed on the touch-screen proximal each physical button.

c. User Interfaces

The multifunction system 10 electronically stores in the processor readable memory 14 a number of activity programs 106 and corresponding activity program icons 108 (respectively designated herein as $AP_i$, and $I_{AP_i}$, where i=1, . . . n), a first set of categories (or applications) 110 and corresponding category icons 112 (respectively designated herein as $Cat_i$, and $I_{C_i}$, where i=1, . . . n) and a second set of subcategories (or themes) 114 and corresponding subcategory icons 116 (respectively designated herein as $SUBCAT_i$, and $I_{SC_i}$, where i=1, . . . n). (see FIG. 1). It further stores a navigation program including instructions for a method of navigation among the categories, subcategories and activities as will be explained.

Each of the activity programs $AP_i$ is associated with a separate one category $Cat_i$ of the first set of categories 110 such that each category $Cat_i$ of the first set 110 is associated with one or more activity programs $AP_i$ of the number of activity programs 106. Each of the activity programs $AP_i$ is further associated with a separate one subcategory $SUBCAT_i$ of the second set of subcategories 114 such that each subcategory $SUBCAT_i$ of the second set 114 is associated with one or more activity programs $AP_i$ of the number of activity programs 106. Each subcategory $SUBCAT_i$ is further associated with one or more of the categories $Cat_i$ such that each subcategory $SUBCAT_i$ of the second set 114 belongs to one or more of the categories $Cat_i$ of the first set 110. Each category $Cat_i$ of the first set 110 includes one or more of the subcategories $SUBCAT_i$ of the second set 114. Each activity program $AP_i$ of the number of activity programs 106 belongs to only one subcategory $SUBCAT_i$ of the second set 114 and only one category $Cat_i$ of the first set 110.

The UI 100, as well as other embodiments described below, enables the user to select one or more of the icons $I_{C_i}$, $I_{SC_i}$, $I_{AP_i}$, which in turn selects the corresponding category, subcategory or activity program by making near contact with or touching the graphics, for example, with a stylus or finger.

FIG. 7 illustrates a first exemplary touch-screen display 118 for the UI 100 in accordance with some embodiments of the present invention.

In some embodiments of the exemplary user interface UI 100, the touch-screen 78 includes a first area 120 for displaying user selectable buttons identified by category icons $I_{C_i}$ corresponding to each category $Cat_i$ of the first set of categories 112. For example, the categories may include one or more edutainment applications, such as a Digital Reader 122, Game Player 124, Notepad 126, Art Studio 128, Audio Player 130, and Photo Viewer 132, the icons for which are shown in FIG. 10.

The digital reader 122 is an application or category that provides as activity programs 106 interactive story books that can be viewed on the touch screen one page at a time. As each of the pages of the story is displayed, the text on the page may be highlighted and read by a narrator.

The game player 124 is an application or category that provides as activity programs 106 arcade-like video games. The content, learning objectives and interactivity for each game varies. The means by which the user interacts with each game may also vary. Some games may only require depressing the action button. Others may require the use of a stylus to tap and drag objects appearing on the screen. Still others may display on-screen directional arrows or a fixed or movable virtual directional control pad to control the movement of an avatar.

The notepad 126 is an application or category that provides as activity programs 106 an opportunity for the user to practice writing. A template for a curriculum item, e.g., a letter or number, may be displayed on the touch screen in a light color. A narrator identifies the item by name and/or sound. Then, the main processor shows the user how to write the item, demonstrating the stroke order for the item in a darker color. The demonstration stroke then fades away, leaving the template on screen as reference for the user to trace.

The Art Studio 128 is an application or category that provides as activity programs 106 a basic drawing application. When the application is launched, a drawing pane appears on the display screen. A feature selection bar with digital buttons provides access to pop-up menus for functions such as music, tools, colors, stampers, erase and backgrounds which the user may use to produce a drawing in the drawing pane.

The audio player 130 is an application or category that provides as activity programs 106 the ability for the user to select for playback audio files that have been stored in memory and that are identified on a playlist.

The photo viewer 132 is an application or category that provides as activity programs 106 the ability for the user to view and edit images stored in the processor readable memory.

In other embodiments, the applications may be typical business applications, such as Calendars, Contacts, Calculator, Alarm Clock, To Do Lists, and the like (not depicted). In still other embodiments, the categories may be a combination of edutainment and business applications or any combination of applications suitable for execution by a portable, multi-function handheld electronic device with a contact-sensitive display.

In some embodiments, the touch-screen 78 includes a second area 134 for displaying one or more of the subcategory icons $Isc_i$ corresponding to each subcategory $Subcat_i$ of the second set of subcategories (or themes) 114 that may be associated with the content of one or more applications. Each subcategory may be represented by a user selectable button with a subcategory icon $Isc_i$ identifying the theme or common feature of the content for the associated activity programs. In general, the subcategories include activity programs that may be grouped in accordance with a taxonomic scheme or hierarchy as shown in FIG. 13.

The second area may have a scroll bar 136, scroll arrows 136a, 136b and a plurality of button windows 138 in which the subcategory icons $Isc_i$ appear. In some instances, the center window 140a of the plurality of buttons windows may be larger than the other button windows 140b, 140c and have the selected subcategory icon appear therein as shown in FIG. 7. In other instances, the scroll bar 136 may have only one button window 140 through which the subcategory icons scroll (see FIG. 8A). In still other instances, the scroll bar 136 may have a plurality of equally sized button windows 140 through which the subcategory icons scroll (see FIG. 8B).

In the edutainment field, trademark and/or copyright protected characters such as Batman, Scooby-Doo, Dora, Sponge-Bob and the like may be the basis for defining one or more sub-categories. For example, a Batman sub-category may include all activity programs having as content features, attributes, characters or characteristics associated with Batman. In the field of music or art, the classification of a subcategory may be based on composer or artist, subject matter or genre and the like.

In some embodiments, one or more of the selectable icons $Ic_i$, $Isc_i$, $Iap_i$ may be displayed at full size on the touch-screen 78. In such instances, all the icons may not be displayable at the same time and one or more additional either horizontal or vertical or both horizontal and vertical scroll bars (not shown) may be provided to scroll through a list of icons arranged sequentially in one dimension such as horizontally or vertically by tapping with the stylus 84 or object on arrow buttons at the opposed ends of the scroll bar. Alternatively, scrolling may be initiated by contacting the touch-screen 78 with the stylus 84 and moving the stylus in a substantially linear manner within parallel spaced apart boundaries such as the boundaries of the scroll bar. In such an instance, scrolling may be terminated upon the occurrence of one or more events, such as when the contact with the touch-screen terminates or when the tip of the stylus crosses a boundary.

In other embodiments, an arbitrary two-dimensional arrangement of icons greater in area than the area of one of the first or second areas of the touch-screen may be brought into view within the touch-screen boundaries by maintaining stylus or object contact with the touch screen and dragging the stylus or object in the direction required to bring in to view the icons beyond the bounds of the touch-screen area.

In some embodiments, the selection icons may appear on the touch-screen in a size smaller than full size. In such instances, a tap or tap and dwell on the icon with a stylus or object may initiate a zoom-in function, enlarging the icon. Breaking contact with the surface may initiate a zoom-out function returning the icon to its original size.

In some embodiments, the touch-screen may include a third area 142 for displaying as a graphic or alphanumeric an identifier 144 representing the identity of the sub-category to which the selectable applications appearing in second area of the touch-screen belong. The graphic or alphanumeric may also appear as a scrollable icon in the second area 134 of the touch-screen.

A fourth area 146 (either contiguous or divided and spaced apart) of the touch-screen may include virtual representations of physical buttons such as an on-screen action button 148 bearing an action icon 148a or home button 150 bearing a home icon 150a discussed above.

FIG. 9 illustrates a second exemplary touch-screen display 152 for the UI 100 in accordance with some embodiments of the present invention. The display 152 has second, third and fourth touch screen areas 134, 142, 146 that are substantially the same as the corresponding areas for the first touch-screen display 118 and are accordingly designated by like reference numerals. The first area 154 of the second exemplary touch-screen display 152 displays the icon for the selected category $Ic_i$ and the icons for the associated selectable activity programs $Iap_i$.

Referring to FIG. 10, another preferred embodiment of a user interface, generally designated 160, and hereafter referred to as the "UI" 160 for the "multifunction system" 60 is shown in accordance with the present invention. The UI 160 has a first exemplary touch-screen display 162 that simultaneously displays a first directory 164 of category or application icons 164a, 164b, 164c, 164d, 164e, 164f corresponding to one or more applications comprising one or more edutainment activities having one or more themes and a second directory 166 of subcategory or theme icons 166a, 166b, 166c corresponding to the one or more themes. A background 168, action icon 170a and home icon 172a may also be simultaneously displayed with the first directory 164 and the second directory 166. As stated earlier, the number of icons in the first and second directories may be more or less than the number shown in FIG. 10. Further, number of icons may be more than can be legibly displayed and may require some form of scrolling or alternatively zooming to be legible.

The background 168 is a scene in front of which the one or more of the selectable icons $Ic_i$, $Isc_i$, $Iap_i$ are displayed and may include attributes associated with a particular subcategory or theme such as color, texture, or graphics. The background 168 may also display a background icon representing the associated subcategory or theme such as the spread-winged bat for the Batman theme shown in FIGS. 14 and 15 or the words "Scooby-Doo!" shown in FIGS. 16 and 17.

The action icon 170a designates a selectable action button 170 on the touch-screen or alternatively, as stated above, the action icon 74a may designate a selectable action button 74 on the housing 62 of some of the embodiments of the multifunctional system. When selected, the action button 170 may launch any preprogrammed function assigned to the button, typically a special effect audio or special effect video animation or a user action required by an executing activity program.

The home icon 172a designates a selectable home button 172 on the touch-screen or alternatively, the home icon 76a may designate a selectable home button 76 on the housing 62. The home button 76, 172 upon selection by contact causes the main processor to display a home screen which simultaneously displays a portion of the taxonomic scheme (or hierarchy) 180 of activity programs. (see FIG. 13) In some embodiments, the taxonomic scheme has a first level 182 corresponding to the first set of categories, a second level 184 corresponding to the second set of subcategories and a third level 186 corresponding to the number of activity programs. In other embodiments, the taxonomic structure may have at least two or more levels and define a wide variety of relationships among the members of each level and between levels.

In some embodiments, the home screen is typically the display in which the first touch screen area 120 (FIG. 7) of the first touch screen display 118 displays to the user the category icons 112 corresponding to the first set of categories (or applications) 110, 182. Each category represents a collection of activity programs belonging to a selected subcategory the corresponding subcategory icon for which is also displayed.

Referring to FIG. 11, the UI 160 has a second exemplary touch-screen display 174 that simultaneously displays a third directory 176 comprising one or more activity icons 176a, 176b, 176c corresponding to the one or more edutainment activities of the associated category or application together with the second directory 166 of subcategory or theme icons. In addition, the second exemplary display 174 may also display an icon or graphic of the associated category or application, such as the joystick icon 164b in FIG. 11 signifying the game player application.

d. Content Navigation

In general, displaying, navigating and selecting content stored in the processor readable memory of some embodiments of the multifunction electronic system 10 having one or more of the above described features involves launching a navigation program stored in the processor readable memory and presenting to the user in response to one or more user contacts with the touch-screen, screen displays having one or more selectable icons corresponding to a desired category, subcategory or activity program.

FIG. 12 shows a preferred embodiment of a method, generally designated 200 and hereinafter referred to as the "navigation method" 200, for navigation among a number of activity programs electronically stored in processor readable memory of a portable handheld multifunction electronic system 10 having at least a main processor in electrical communication with the processor readable memory and with a contact-sensitive display in accordance with the present invention. In some embodiments, multifunctional system 10 includes storage medium reader in electrical communication with the processor and a processor readable storage medium having stored therein instructions for the navigation method 200. The instructions when executed by the main processor of a portable handheld multifunction electronic system cause the system to execute as steps, the steps of the navigation method 200.

In a simultaneously displaying step 210, the navigation method 200 simultaneously displays on the contact-sensitive display 78, a first plurality of category icons 112 and at least one subcategory icon 116 including a currently selected subcategory icon representing a currently selected subcategory of the system. A home icon 172 is also displayed either on the contact-sensitive display 78 or may be displayed as an icon 76a on a first button switch 76 in electrical communication with the processor 12. Each of the displayed subcategory icons 116 corresponds to a separate one of the subcategories of the second set of subcategories 114. Each of the displayed category icons 112 corresponds to a separate one of the categories of the first set of categories 110 that includes the currently selected subcategory corresponding to the currently selected subcategory icon. The currently selected subcategory represents the subcategory that is controlling in the navigation of the system 200 as will be appreciated from the following explanation. The home icon is associated with a home screen comprising at least the currently selected subcategory icon and each category icon corresponding to a separate one of the categories of the first set that includes the currently selected subcategory. The home icon 172, 76a is associated with a home screen which displays on the contact-sensitive display 78 only a portion 188 of the taxonomic scheme 180 (depicted in FIG. 13) having a first level corresponding to the first set categories, a second level corresponding to the second set of subcategories and a third level corresponding to the number of activity programs.

In some embodiments, the simultaneously displaying step 210 further comprises displaying on the contact-sensitive display 78 a background 168. It may further or alternatively comprise displaying an action icon 170 on the contact-sensitive display 78 or on a second button switch (e.g., action button 74) in electrical communication with the processor (see FIG. 10). The background 168 may be associated with the currently selected (and controlling) subcategory and its icon 116b and may have one or more of the attributes discussed above. The processor may initiate the display of an animation when one or more contacts with the contact-sensitive display or the second button switch are determined to be a selection of the action icon. In some embodiments, tapping the action button may be the way a user provides a required input to a preprogrammed event in an activity program.

From the displaying step 210, a first determining step 215 comprises determining whether a first occurrence of one or more contacts with the contact-sensitive display 78 represents as a first user selection, a selection of another, newly selected subcategory different from the currently selected subcategory and corresponding to another of the displayed subcategory icons, or, a selection of a first category corresponding to a first category icon of the first plurality of displayed category icons.

If a newly selected subcategory has been selected in the first determining step 215, a first changing step 220 is executed. The first changing step 220 comprises at least changing the subcategory represented by the first plurality of displayed category icons to the newly selected subcategory such that each of the plurality of displayed category icons representing a separate category of the first set further represents the newly selected subcategory and further represents links to a collection of the activity programs also belonging to the newly selected subcategory of the displayed category.

If a first category icon has been selected in the first determining step 215, the replacing step 230 is executed. In the replacing step 230, the first plurality of displayed category icons is replaced with a display of one or more activity program icons. Each of the one or more displayed activity program icons corresponds to a separate one of the activity programs belonging to the first selected category and to the currently selected subcategory.

If the home screen (e.g. 302, 340) has been selected in the first determining step 215, nothing changes. The displayed first plurality of category icons and the at least currently selected subcategory icon represent the home screen for the currently selected subcategory and remains displayed on the contact-sensitive display 78 as the system awaits a user selection of a category or subcategory.

A second determining step 235 follows the first determining step 215 where a first category icon has been selected. The second determining step 235 comprises determining whether a second occurrence of one or more contacts with the contact-sensitive display 78 (or with the first/home button 74, if the home icon is provided on a button) represents as a user selection, a selection of one activity program corresponding to one selected activity program icon of the one or more activity program icons being displayed on the contact-sensitive display 78, or a selection of a newly selected subcategory different from the at least currently selected subcategory and corresponding to a newly selected subcategory icon being displayed on the contact-sensitive display and different from the currently selected subcategory icon also being displayed, or a selection of the home icon.

If the one activity program has been selected in the second determining step 235, the executing step 240 is launched. In the executing step 240, the one selected activity program is executed by the main processor. In some embodiments, the executing step 240 launches the one selected activity program with an application corresponding to the first selected category and selected from a first set of categories/applications preferably including at least a digital reader, a game player, a notepad, an art studio, an audio player and a photo viewer.

In some embodiments, upon completion of the activity program, the main processor automatically causes the contact-sensitive display 78 to display the screen that was displayed prior to the execution of the second determining step 235. In other embodiments, the activity program continues to execute until terminated by the user in a third determining step 245 discussed below.

If a different subcategory has been newly selected in the second determining step 235, a second changing step 250 is executed. The second changing step 220 comprises at least changing the first set of one or more activity program icons being displayed on the contact-sensitive display 78 to a display of a different second set of one or more activity program icons, each of the different displayed activity program icons of the second set corresponding to a separate one of the activity programs belonging to the first selected category and to the newly selected subcategory. Additionally, the changing step 250 may further include changing some aspect(s) of the newly selected subcategory icon such as its appearance and/or location to signify its status as the new, currently selected subcategory of the system.

If the home icon is selected in the second determining step 235, the home screen for the currently selected subcategory is displayed on the contact-sensitive display. This would include the first plurality of category icons and at least the currently selected subcategory icon, in other words, the display as it existed in the simultaneously displaying step 210.

A third step 245 comprises determining whether a third occurrence of one or more contacts with the contact-sensitive display 78 (or the first button switch/home button 74) represents a user selection of a home screen during or after execution of the one selected activity program. The navigation system may be configured to permit interruption of an executing activities program or not permit such interruption. If the home screen is selected and recognized by the navigation program as occurring at an appropriate point in the execution of the one selected activity program, the home screen for the currently selected subcategory is displayed on the contact-sensitive display 78. In other words, the navigation system returns to the display provided during the initial, simultaneously displaying step 210. Alternatively, the existing display on the contact-sensitive display 78 may be replaced with a display including at least the currently selected subcategory icon and the activity program icons belonging to the currently selected subcategory and the first selected category. This could be identical to the display that was on the contact-sensitive display 78 at the beginning of the second selection step 235 or it could be a different arrangement.

In other embodiments, the "navigation method" 200 further comprises the step of storing another activity program in the processor readable memory. This other activity program may be associated with one of the first set of categories. Alternatively, this other activity program may be associated with a new category to be added to the first set of categories. This other activity may be associated with an existing subcategory of the second set of subcategories or may be associated with a new subcategory to be to the second set of subcategories. The storing step further comprises adding the new category to the first set of categories and/or the new subcategory to the second set of subcategories if the new category and/or the new subcategory are not already stored in memory.

In some embodiments of the navigation method 200, the storing step further comprises generating, with a media management program hosted on another electronic device, a user interface on a display of the another electronic device enabling a user to control the transfer of the another activity program stored in the electronic memory of the another electronic device from the another electronic device to the processor readable memory of the portable handheld multifunction electronic system.

Referring to FIGS. 10, 11 and 14-18, another preferred embodiment of a method, generally designated 300, and hereinafter referred to as the "navigation method 300" for navigating among edutainment activities stored in processor readable memory of an electronic edutainment device 60 having processor in electrical communication with a contact-sensitive display and the memory in accordance with the present invention is described briefly below.

For illustrative purposes and for brevity, the description only includes the first touch-screen display 118 for two subcategories or themes, Batman and Scooby-Doo and the second touch-screen display (or application screen) 112 for one category, game player, of six categories appearing in the first touch-screen display. As stated above, in some embodiments, the number of applications may be more than six or less than six and the number of themes may be more than two or less than two. In the example, the displayed icons appear in front of a textured background. The action and home buttons are hardware buttons on the housing and do not appear on the touch screen.

Referring to FIG. 14, the home screen (or first touch-screen display) 302 is shown for the Batman theme. The first area 304 of the Batman home screen 302 displays a first directory (or first set) 306 of six application (or category) icons corresponding to the following six applications: digital reader, game player, notepad, art studio, audio player, and photo viewer. The game player application is represented by a joystick icon 308. The second area 310 of the Batman home screen 302 displays a scroll bar 312 with a single window 314 in which a second directory (or second set) 316 of theme (or subcategory) icons is scrollable and in the example, an icon corresponding to the Batman theme appears. The third area 320 of the Batman home screen 302 displays a graphic or logo 322 associated with the Batman theme, in this case a spread-winged bat.

Selecting the joystick icon 308 with a stylus 324 launches the game player application and displays the game player application screen (or second touch-screen display) 326 associated with the Batman theme (see FIG. 15). The first area 328 of the game player application screen displays a third directory 330 of game icons (or activity program icons) and the joystick icon 308 representing the game player application. In the example, the user may select any one of three games, all having Batman related content. The displayed content of the second 334 and third areas 336 of the game player application screen 326 are the same as the Batman home screen 302.

Referring to FIG. 16, the home screen (or first touch-screen display home screen) 340 is shown for the Scooby-Doo™ theme. The first area 342 of the Scooby-Doo home screen displays as a first directory (or first set) 344 of six application (or category) icons substantially the same as the first directory 306 for the Batman home screen 302. The second area 348 of the Scooby-Doo home screen displays a scroll bar 350 with a single window 352 in which a second directory (or second set) 354 of theme (or subcategory) icons is scrollable and in the example, an icon of Scooby-Doo appears. The third area 358 of the Scooby-Doo home screen displays a graphic or logo 360 associated with the Scooby-Doo theme, in this case a stylized spelling of the words "Scooby-Doo."

Selecting the joystick icon 346 with a stylus 362 launches the game player application and displays the game player application screen (or second touch-screen display) 364 associated with the Scooby-Doo theme (see FIG. 17). The first area 366 of the game player application screen displays a third directory 368 of game icons (or activity program icons) and the joystick icon 346 representing the game player application. In the example, the user may select one of three games, all having Scooby-Doo related content. The displayed content of the second and third areas 372, 374 of the game player application screen 364 are the same as the Scooby-Doo home screen 340.

Referring to FIGS. 14 and 15 or FIGS. 16 and 17, navigating among applications within a theme (or categories associated with a subcategory) is accomplished from the home screen (FIG. 14 or 16) by selecting the desired application with a stylus. In the example, selecting the joystick icon 308, 346 representing the game player application causes the content in the first area 304, 342 of the home screen 302, 340 to be replaced with a third directory (or menu) 330, 368 of selectable game icons. Selecting one of the available game icons (or activity icons) with a stylus launches the corresponding game (or activity program) generating full-screen displays determined by the instructions encoded in the game software (or activity program). Upon completion of the selected game, the application screen from which the game was launched reappears on the touch-screen display.

From the application screen, another game may be launched by selecting the game icon corresponding to the another game. Alternatively, if another game associated with a different theme is desired, using the scroll arrows to scroll theme icons through the scroll window 314, 352 until the desired theme icon appears and then selecting the desired theme icon causes the third directory of game icons associated with the desired theme to appear in the first area of the display, allowing the desired another game to be selected by tapping the associated icon.

If another activity program associated with a different application associated with same theme is desired, the use may return from the current application screen to the home screen for the current theme by tapping the current theme icon when it appears in the scroll window. Navigating between home screens is accomplished by using the scroll arrows to scroll home screen icons through the scroll window and selecting the desired theme. FIG. 18 diagrammatically illustrates the navigational aspects of the above example.

Referring to FIG. 19, another embodiment of a method, generally designated 400, and hereinafter referred to as the "navigation method" 400 for navigating among activities stored in processor readable memory of an electronic edutainment device having processor in electrical communication with a contact-sensitive display and the memory in accordance with the present invention is briefly described below. In some embodiments, the edutainment device 60 includes storage medium reader in electrical communication with the processor and a processor readable storage medium having stored therein instructions for the navigation method 400. The instructions when executed by the main processor of the edutainment device cause the device to execute as steps, the steps of the navigation method 400.

In a simultaneously displaying step 410, the navigation method 400 simultaneously displays a first directory of application icons corresponding to one or more applications comprising one or more edutainment activities having at least one theme, at lease one theme icon of a second directory of theme icons corresponding to one or more themes including the at lease one theme and a home icon associated with a home screen. The first directory of application icons and the at lease one theme icon of a second directory of theme icons are displayed on the contact-sensitive display. The home icon is displayed on the contact-sensitive display or on a first button switch in electrical communication with the processor.

In some embodiments, the simultaneously displaying step 410 further comprises displaying a background 168 on the contact-sensitive display 78 and/or displaying an action icon 170 on the contact-sensitive display 78 or on a second button switch (or action button) in electrical communication with the processor. The background 168 may be associated with the at least one theme icon 166 and may have the attributes discussed above. The processor initiates the display of an animation when one or more contacts with the contact-sensitive display or the second button switch are determined to be a selection of the action icon. In some embodiments, tapping the action button may be the way a user provides a required input to a preprogrammed event in an activity program.

The first determining step 215 comprises determining whether one or more contracts with the contact-sensitive display represents as a first selected icon a selection of one of the application icons of the first directory or a selection of another theme icon of the second directory, the another theme icon corresponding to a different theme than the at lease one theme.

If another theme icon has been selected in the first determining step 215, a first changing theme step 420 is executed. The first changing theme step 420 comprises changing the theme of the applications represented by the application icons in the first directory to another theme or changing the activities represented by the activity icons in the third directory to other activities having the another theme.

If one of the application icons has been selected in the first determining step 215, a replacing step 430 is executed. The replacing step comprises replacing the first directory with a third directory comprising one or more activity icons corresponding to the one or more edutainment activities of the selected application.

In some embodiments, the first determining step further includes determining whether one or more contracts with the contact-sensitive display or the second button switch represents as a first selected icon a selection of one of the home screen and if the home screen has been selected, the home screen for the currently selected subcategory is displayed on the contact-sensitive display.

The second determining step 435 comprises determining whether a first another one or more contracts with the contact-sensitive display represents as a second selected icon a selection of one of the edutainment activity icons, or a selection of another theme icon of the second directory and the another theme icon corresponds to a different theme than the at lease one theme.

If the another theme icon corresponding to a different theme has been selected in the second determining step 435, a second changing theme step 440 is executed. The second changing theme step 440 comprises changing the activities represented by the activity icons in the third directory to other activities corresponding to the different theme. If an edutainment activity icon has been selected in the second determining step 435, an executing step 450 initiates execution of an edutainment activity corresponding to the selected edutainment activity icon. In some embodiments, the executing step 450 launches the separate one activity program with an application selected from the group of a digital reader, a game player, a notepad, an art studio, an audio player and a photo viewer.

The third determining step 455 comprises determining whether a second another one or more contracts with the contact-sensitive display or the first button switch represents as a third selected icon a selection of the home icon. If the home icon is selected, the home screen for the at least one theme associated with the edutainment activity of the initiating execution step is displayed on the contact-sensitive display, otherwise, execution of the edutainment activity of the initiating executing step continues or the third directory of activity icons displayed immediately prior to the initiating execution step is displayed.

Referring to FIG. 20, in some embodiments, the "navigation method" 400 further comprises the step of storing another edutainment activity 461 in the processor readable memory 14. The another edutainment activity 461 may be associated with another theme and with one or more of the applications in the first directory of applications. Alternatively, the another edutainment activity 461 may be associated with an new application to be added to the first directory of applications. The another edutainment activity 461 may be associated with an existing theme or may be associated with a new theme to be to the second directory of themes. The storing step further comprises adding another activity icon corresponding to the another edutainment activity to the third directory of activity icons and also adding a new application icon corresponding to the new application to the directory of icons applications or a new theme icon corresponding to the new theme to the directory of themes icons if the new application or theme is not already stored in memory.

In some embodiments of the navigation method 400, the storing step comprises generating a host user interface 466 with a media management program 460 hosted on another electronic device 462 having a display 464, for example, a user's personal computer. The host user interface 466 enables a user to control the transfer of the another edutainment activity 461 stored in the electronic memory 468 of the another electronic device 462 from the another electronic device 462 to the processor readable memory 14 of the edutainment device 60. The media management program 460 maintains a record of all the software (applications, themes, edutainment activities and associated icons) installed on the edutainment device 60 in a database 470 stored in electronic memory 468 on the another electronic device 462.

Referring to FIG. 21, in some embodiments, the generating a host user interface step further comprises generating as the host user interface 466 on the display 464 of the another electronic device 462 a first tabbed window 472 with a tab 472a labeled "My Library". The first tabbed window 472 is divided into a first pane 474 and a second pane 476. The first pane 474 is also labeled "My Library" and displays in a software sub-pane 474a a library directory 478 of edutainment activities stored in the memory 468 on the another electronic device 462, which is connectable to the processor 12 of the edutainment device 60 by the communication link 480. The second pane 476 is labeled "My Handheld" (referring to the edutainment device 60) and displays in a software sub-pane 476a a device directory 482 of edutainment activities stored in the memory 14 of the edutainment device 60. Both panes 474, 476 may have additional sub-panes for such subject matter as pictures and music. In some embodiments, the number of sub-panes may be more than three or less than three.

Tapping the Transfer Software icon 484 between the first (or My Library) pane 474 and the second (or My Handheld) pane 476 transfers the files that are checked in the My Library pane 474 to the edutainment device 60 and adds the transferred file names to the device directory 482 of the software sub-pane 476a. Checked files in the My Handheld pane 476 may be removed from the associated directory 482 and deleted from the corresponding memory 14 of the edutainment device 60 by tapping the trash can icon 486.

A memory gauge 488 indicates the amount of used and free memory for the memory 14 of the edutainment device 60.

In some embodiments, in addition to the first tabbed window 472, the host user interface 466 may include additional tabbed windows, such as a Welcome window 490 viewable by tapping a Welcome tab 499a (see FIG. 22) and/or a Customize window 494 viewable by tapping a Customize tab 494a (see FIG. 23). The Welcome window 490 provides to the user a plurality of resources accessible by tappable links 498 that may include, but not be limited to start-up instructions, a user's guide, internet hosted consumer relations center, additional activities. The customize window 494 allows the user to enter customizing data in data fields 500, such as the user's name and/or select from multiple choices features or attributes appearing in drop-down menus 502, such as selecting a favorite color, snack, drink or animal. The user may also choose a predetermined profile 504 or input a user's photograph 506.

Those skilled in the art will appreciate that changes could be made to the embodiments described above without departing from the broad inventive concept thereof. Therefore, the system and method for displaying, navigating and selecting electronically stored content on a multifunction handheld device is not limited to the particular embodiments disclosed, but it is intended to cover modifications within the spirit and scope of the present invention as defined by the appended claims.

All references, patent applications, and patents mentioned above are incorporated herein by reference in their entirety and are not to be construed as an admission that any of the cited documents constitutes prior art, or as an admission against interest in any manner.

We claim:

1. A method for navigating among a plurality of activity programs electronically stored in processor-readable non-transitory memory of a portable handheld multifunction electronic system having at least a main processor in electrical communication with the memory and with a contact-sensitive display, comprising the steps of:

simultaneously displaying on the contact-sensitive display a home screen comprising a plurality of category icons and a predetermined subcategory icon being a currently selected subcategory icon, each separate category icon of the plurality of category icons associated with one separate category of a plurality of categories, each separate category icon having a link to one or more activity programs of the plurality of activity programs, the one or more activity programs being linked to each category icon also being associated the currently selected subcategory;

determining, in a first selecting step, whether one or more contacts with the contact-sensitive display represents a user selection of a first selected category corresponding to a first selected category icon of the plurality of displayed category icons, or a user selection of another subcategory corresponding to another displayed subcategory icon, and, in response, if the first selected category has been selected, replacing the plurality of displayed category icons with a display of one or more activity program icons, each of the one or more displayed activity program icons corresponding to a separate one of the activity programs belonging to the first selected category and to the currently selected subcategory, or if another subcategory has been selected, continuing to display the plurality of displayed category icons, changing the currently selected subcategory icon to the another subcategory icon and changing the link of each separate displayed category icon to a different one or more activity programs of the number of activity programs, the different one or more activity program being associated the another subcategory and with each category of the category icons being displayed.

2. The method of claim 1, wherein the simultaneously displaying step displays a home icon simultaneously with the displaying of the first plurality of category icons and the subcategory icon, the home icon being displayed on the contact-sensitive display or on a first button switch in electrical communication with the main processor, the home icon being associated with the home screen; and the determining step further includes determining whether the one or more contacts with the contact-sensitive display or the first button switch represents a user selection of the home screen, and, in response, if the home screen has been selected, displaying the home screen on the contact-sensitive display.

3. The method of claim 2, wherein the simultaneously displaying step further comprises displaying a background on the contact-sensitive display or displaying an action icon on the contact-sensitive display or on a second button switch in electrical communication with the processor, the background associated with the currently selected subcategory icon, the processor initiating the display of an animation when the one or more contacts with the contact-sensitive display or the second button switch is determined to be a user selection of the action icon.

4. The method of claim 1, further comprising determining, in a second selecting step, whether another one or more contacts with the contact-sensitive display represents a user selection of a separate one activity program of the number of activity programs, the separate one activity program corresponding to a selected activity program icon of the one or more activity program icons being displayed on the contact-sensitive display, and, in response, if the separate one activity program has been selected, executing by the main processor the separate one activity program.

5. The method of claim 4, wherein the executing step launches the separate one activity program with an application selected from the group of reader, game player, notepad, art studio, audio player, and photo viewer.

6. The method of claim 1, further comprising:

storing another activity program in the processor readable memory, the another activity program being associated with a separate one category of the plurality of categories and further being associated with another subcategory different from each separate subcategory of the plurality of subcategories; and adding the another subcategory to the plurality of subcategories.

7. The method of claim 6, wherein the storing step comprises generating, with a media management program hosted on another electronic device, a user interface on a display of the another electronic device enabling a user to control the transfer of the another activity program stored in an electronic memory of the another electronic device from the another electronic device to the processor readable memory of the portable handheld multifunction electronic system.

8. A portable handheld multifunction electronic system comprising:

at least a main processor in electrical communication with a processor-readable non-transitory memory and with a contact-sensitive display;

a plurality of activity programs electronically stored in the memory; and a navigation program stored in the memory, the navigation program encoding the navigation method of claim 1.

9. A processor-readable non-transitory storage medium having stored therein a first encoding transferable to a processor-readable non-transitory memory of a portable multifunctional electronic system comprising:

at least a main processor in electrical communication with the memory and with a contact-sensitive display;

a plurality of activity programs electronically stored in the memory; and a navigation program stored in the memory, the navigation program encoding the navigation method of claim 1, the first encoding executable by the main processor of the multifunctional electronic system, the first encoding comprising instructions and data for another activity program being associated with a separate one category of the plurality of categories of the multifunctional electronic system and further being associated with another subcategory different from each separate subcategory of the plurality of subcategories of the multifunctional electronic system.

10. A first processor-readable non-transitory storage medium having stored therein a second encoding of a media management program executable by another electronic device having a first processor in electrical communication with a storage medium reader and a display, the second encoding when read and executed by the first processor generating a user interface on the display of the another electronic device, the user interface enabling a user to control a transfer of a first encoding of another activity program stored in the first storage medium or in another processor-readable non-transitory storage medium from the another electronic device to a processor readable memory of a portable handheld multifunction electronic system when the first processor is in electrical communication with a main processor of the multifunction electronic system, the first encoding comprising instructions and data for the another activity program executable by the main processor, the another activity program being associated with a separate one category of a plurality of categories of the multifunctional electronic system and further being associated with another subcategory different from each other separate subcategory of a plurality of subcategories of the multifunctional electronic system, the multifunction electronic system comprising:

at least the main processor in electrical communication with the memory and with a contact-sensitive display;

a number of activity programs electronically stored in the memory; and a navigation program stored in the memory, the navigation program encoding the navigation method of claim 1.

11. A method for navigating among a plurality of activity programs electronically stored in processor-readable non-transitory memory of a portable handheld multifunction electronic system having at least a main processor in electrical communication with the memory and with a contact-sensitive display, each of the activity programs being associated with a separate one of a first set of categories such that each category of the first set is associated with one or more of the plurality of activity programs, each of the activity programs further being associated with a separate one of a second set of subcategories such that each subcategory of the second set is associated with one or more of the plurality of activity programs, each subcategory further being associated with one or more of the categories such that each subcategory of the second set belongs to one or more of the categories of the first set, each category of the first set includes one or more of the subcategories of the second set, and each activity program of the plurality of activity programs belonging to only one subcategory of the second set and only one category of the first set, the method comprising the steps of:

simultaneously displaying a first plurality of category icons, at least one subcategory icon and a home icon, the first plurality of category icons and the at least one subcategory icon being displayed on the contact-sensitive display, the home icon being displayed on the contact-sensitive display or on a first button switch in electrical communication with the processor, each displayed subcategory icon corresponding to a separate one of the subcategories of the second set, each of the displayed category icons corresponding to a separate one of the categories of the first set that includes the at least one subcategory corresponding to the at least one subcategory icon, the home icon being associated with a home screen comprising a predetermined subcategory icon being a currently selected subcategory icon and each category icon corresponding to a separate one of the categories of the first set that includes the currently selected subcategory icon;

determining, in a first selecting step, whether one or more contacts with the contact-sensitive display or the first button switch represents as a first selection a selection of one selected subcategory different from the at least one subcategory corresponding to the at least one displayed subcategory icon or a selection of one selected category corresponding to a selected display icon of the plurality of displayed category icons or the selection of the home screen;

if the one selected category has been selected, replacing the first plurality of displayed category icons with a display of one or more activity program icons, each of the one or more displayed activity program icons corresponding to a separate one of the activity programs belonging to the one selected category and to the at least one subcategory, or if the one selected subcategory has been selected, (a) changing the at least one displayed subcategory icon to another at least one displayed subcategory icon corresponding to the one selected subcategory, (b) changing the subcategory represented by the first plurality of displayed category icons to the one selected subcategory such that each of the first plurality of displayed category icons representing a separate category of the first set further represents a collection of the activity programs belonging to the one selected subcategory of the displayed category and (c) continuing the display of the first plurality of displayed category icons, or if the home screen has been selected, displaying the home screen on the contact-sensitive display;

determining, in a second selecting step, whether a first another one or more contacts with the contact-sensitive display or the first button switch represents a first another selection of the separate one activity program corresponding to a selected activity program icon of the one or more activity program icons being displayed on the contact-sensitive display in response to the first selecting step, or a first another selection of one selected subcategory different from the at least one subcategory corresponding to the at least one displayed subcategory icon or a first another selection of the home screen;

if the separate one activity program has been selected, executing by the main processor the separate one activity program, or if the home screen has been selected, displaying the home screen for the currently selected subcategory on the contact-sensitive display, or if the different subcategory has been selected (a) changing the at least one displayed subcategory icon to another at least one displayed subcategory icon corresponding to the different subcategory and (b) changing the one or more activity program icons being displayed on the contact-sensitive display to a display of a different one or more activity program icons each of the different one or more displayed activity program icons corresponding to a separate one of the activity programs belonging to the one selected category and to the another at least one displayed subcategory;

determining, in a third selecting step, whether a second another one or more contacts with the contact-sensitive display or the first button switch represents a second another selection of the home screen; and if the home screen is selected, displaying the home screen on the contact-sensitive display, otherwise, continuing execution of the activity program of the executing step or displaying the activity icons belonging to the currently selected subcategory and the one category to which the activity program of the executing step belongs.

12. The method of claim 11 wherein the simultaneously displaying step further comprises displaying a background on the contact-sensitive display or displaying an action icon on the contact-sensitive display or on a second button switch in electrical communication with the processor, the background associated with the at least one subcategory icon, the processor initiating the display of an animation when one or more contacts with the contact-sensitive display or the second button switch is determined to be a selection of the action icon.

13. The method of claim 11, wherein the executing step launches the separate one activity program with an application selected from the group of reader, game player, notepad, art studio, audio player, and photo viewer.

14. The method of claim 11 further comprising:

storing another activity program in the memory, the another activity program being associated with a separate one of the first set of categories and further being associated with another subcategory; and adding the another subcategory to the second set of subcategories.

15. The method of claim 14, wherein the storing step comprises generating, with a media management program hosted on another electronic device, a user interface on a display of the another electronic device enabling a user to control the transfer of the another activity program stored in a non-transitory electronic memory of the another electronic device from the another electronic device to the memory of the portable handheld multifunction electronic system.

16. A portable handheld multifunction electronic system comprising:

at least a main processor in electrical communication with a processor-readable non-transitory memory and with a contact-sensitive display;

a plurality of activity programs electronically stored in processor-readable non-transitory memory, each of the activity programs being associated with a separate one of a first set of categories such that each category of the first set is associated with one or more of the plurality of activity programs, each of the activity programs further being associated with a separate one of a second set of subcategories such that each subcategory of the second set is associated with one or more of the plurality of activity programs, each subcategory further being associated with one or more of the categories such that each subcategory of the second set belongs to one or more of the categories of the first set, each category of the first set including one or more of the subcategories of the second set, and each activity program of the plurality of activity programs belonging to only one subcategory of the second set and only one category of the first set; and a navigation program stored in the memory, the navigation program encoding the navigation method of claim 11.

17. A processor-readable non-transitory storage medium having stored therein a first encoding transferable to the processor readable memory of the multifunctional electronic system of claim 16 and executable by the main processor of the multifunctional electronic system, the encoding comprising instructions and data for another activity program being associated with a separate one category of the plurality of categories of the multifunctional electronic system and further being associated with another subcategory different from each separate subcategory of the plurality of subcategories of the multifunctional electronic system.

18. A processor-readable non-transitory storage medium having stored therein a second encoding of a media management program executable by another electronic device having a first processor in electrical communication with a storage medium reader and a display, the encoding when read and executed by the first processor generating a user interface on the display of the another electronic device, the user interface enabling a user to control the transfer of a first encoding of another activity program stored in a processor-readable non-transitory storage medium from the another electronic device to a processor readable memory of the portable handheld multifunction electronic system of claim 16 when the first processor is in electrical communication with the main processor of the multifunction electronic system, the first encoding comprising instructions and data for the another activity program executable by the main processor, the another activity program being associated with a separate one category of the first set of categories of the multifunctional electronic system and further being associated with another subcategory different from each separate subcategory of the second set of subcategories of the multifunctional electronic system.

19. A method for navigating among edutainment activities stored in processor-readable non-transitory memory of an electronic edutainment device having processor in electrical communication with a contact-sensitive display and the memory, the method comprising the steps of:

simultaneously displaying a first directory of application icons corresponding to one or more applications comprising one or more of the edutainment activities having at least one theme, at least one theme icon of a second directory of theme icons corresponding to one or more themes including the at least one theme and a home icon, the first directory of application icons and the at least one theme icon of a second directory of theme icons being displayed on the contact-sensitive display, the home icon being displayed on the contact-sensitive display or on a first button switch in electrical communication with the processor, the home icon being associated with a home screen;

determining, in a first selecting step, whether one or more contacts with the contact-sensitive display or the home button represents as a first selected icon a selection of one of the application icons of the first directory or a selection of another theme icon of the second directory, the another theme icon corresponding to a different theme than the at least one theme;

replacing the first directory with a third directory if one of the application icons has been selected, the third directory comprising one or more activity icons corresponding to the one or more edutainment activities associated with the application corresponding to the first selected icon; or continuing to display the first directory of application icons and changing the theme of the applications represented by the application icons in the first directory to another theme or changing the activities represented by the activity icons in the third directory to other activities having the another theme, if the another theme icon has been selected; or determining, in a second selecting step, whether a first another one or more contacts with the contact-sensitive display represents as a second selected icon a selection of one of the edutainment activity icons, or a selection of another theme icon of the second directory, the another theme icon corresponding to a different theme than the at least one theme; and if an edutainment activity icon has been selected, initiating execution of the corresponding edutainment activity; or if a different theme has been selected, changing the edutainment activities represented by the activity icons in the third directory to other edutainment activities corresponding to the different theme;

determining, in a third selecting step, whether a second another one or more contacts with the contact-sensitive display or the first button switch represents as a third selected icon a selection of the home icon; and if the home icon is selected, displaying the home screen for the at least one theme associated with the edutainment activity of the initiating execution step, otherwise, continue executing the edutainment activity of the initiating execution step or displaying as the third directory the activity icons displayed immediately prior to the initiating execution step.

20. The method of claim 19 wherein the simultaneously displaying step further comprising displaying a background on the contact-sensitive display or displaying an action icon on the contact-sensitive display or on a second button switch in electrical communication with the processor, the background stored in the memory and associated with one theme icon of the second directory, the action icon initiating the display of an animation stored in the memory on the contact-sensitive display when one or more contacts with the contact-sensitive display of the second button switch is determined to be a selection of the action icon.

21. The method of claim 19, wherein the initiating execution step launches the one of the edutainment activities with an application selected from the group of reader, game player, notepad, art studio, audio player, and photo viewer.

22. The method of claim 19 further comprising:

storing another edutainment activity in the memory, the another edutainment activity being associated with another theme and with the one or more applications; and adding another theme icon associated with the another edutainment activity to the second directory.

23. The method of claim 22, wherein the storing step comprises generating, with a media management program hosted on another electronic device, a user interface on a display of the another electronic device enabling a user to control the transfer of the another edutainment activity from the another electronic device to the memory.

24. The method of claim 23, wherein the generating a user interface step further comprises:

generating a first tabbed window divided into a first pane and a second pane;

displaying in the first pane a library directory of edutainment activities stored on a computer connectable to the processor by a communication link and transferable to the edutainment device; and displaying in the second pane a device directory of edutainment activities stored in the memory of the edutainment device.

25. An electronic edutainment device comprising:

a contact-sensitive display;

a processor-readable non-transitory memory;

a processor electrically connected to the display and the memory;

one or more applications comprising one or more edutainment activities stored in the memory, each edutainment activity comprising an edutainment program configured to be executed by the processor, each edutainment program having one or more themes; and a display navigation program stored in the memory, the navigation program encoding the navigation method of claim 19.

26. A processor-readable non-transitory storage medium having stored therein a first encoding transferable to a processor-readable non-transitory memory of an electronic edutainment device comprising:

a contact-sensitive display;

the processor-readable non-transitory memory;

a main processor electrically connected to the display and the memory;

one or more applications comprising one or more edutainment activities stored in the memory, each edutainment activity comprising an edutainment program configured to be executed by the main processor, each edutainment program having one or more themes; and a display navigation program stored in the memory, the navigation program encoding the navigation method of claim 19, the first encoding-executable by the main processor of the electronic edutainment device, the first encoding comprising instructions and data for another activity program being associated with a separate one application of the first directory of applications of the multifunctional electronic system and further being associated with another theme different from each other separate theme of the second directory of themes of the multifunctional electronic system.

27. A first processor-readable non-transitory storage medium having stored therein a second encoding of a media management program executable by another electronic device having a first processor in electrical communication with a storage medium reader and a display, the second encoding when read and executed by the first processor generating a user interface on the display of the another electronic device, the user interface enabling a user to control a transfer of a first encoding of another activity program stored in the first storage medium from the another electronic device to processor-readable non-transitory memory of an electronic edutainment device when the first processor is in electrical communication with a main processor of the electronic edutainment device, the first encoding comprising instructions and data for the another activity program executable by the main processor, the another activity program being associated with a separate one category of a plurality of categories of the electronic edutainment device and further being associated with another subcategory different from each other separate subcategory of a plurality of subcategories of the electronic edutainment device, the electronic edutainment device comprising:

a contact-sensitive display;

the processor-readable non-transitory memory;

the main processor electrically connected to the display and the memory;

one or more applications comprising one or more edutainment activities stored in the memory, each edutainment activity comprising an edutainment program configured to be executed by the main processor, each edutainment program having one or more themes; and a display navigation program stored in the memory, the navigation program encoding the navigation method of claim 19.

28. A method for navigating among a plurality of activity programs electronically stored in processor-readable non-transitory memory of a portable handheld multifunction electronic system having at least a main processor in electrical communication with the memory and with a contact-sensitive display, comprising the steps of:

simultaneously displaying on a display the contact-sensitive home screen comprising a plurality of applications and an initial theme as a current theme, each separate application having a link to an activity program of the plurality of activity programs having the current theme;

determining, in a first selecting step, whether a contact with the contact-sensitive display selects one of the applications or selects another theme, and, in response, if one of the applications has been selected, replacing the plurality of displayed applications with a display of the activity program linked to the selected application, or if another theme different than the current theme has been selected, continuing to display the plurality of displayed applications, changing the current theme to the another theme and changing the link of each separate application to another activity program associated with the application and having the another theme.

29. The method of claim 28 further comprising:

determining, in a second selecting step, whether another contact with the contact-sensitive display selects the activity program displayed in response to the first selecting step or another theme different than the current theme and, in response, if the activity program has been selected, executing by the main processor the activity program, or if another theme has been selected, changing the current theme to the another theme, changing the activity program displayed in response to the first selecting step to another activity program associated with the last selected application and having the another theme, and changing the link of each separate application to another activity program associated with the application and having the another theme.

30. The method of claim 29 further comprising:

displaying a home icon on the contact-sensitive display or on a button switch in electrical communication with the main processor; and further determining, in the second selecting step, whether the another contact with the contact-sensitive display or the button switch selects the home icon, and, in response, if the home icon has been selected, displaying the home screen on the contact-sensitive display.

31. The method of claim 30 further comprising:

determining, in a third selecting step, whether the executing step has completed execution of the activity program or another contact with the contact-sensitive display selects the home icon and, in response, if execution of the activity program has been completed, displaying the activity program associated with the last selected application or if the home icon has been selected, displaying the home screen on the contact-sensitive display.

32. A portable handheld multifunction electronic system comprising:

at least a main processor in electrical communication with a processor-readable non-transitory memory and with a contact-sensitive display;

a plurality of activity programs electronically stored in the memory; and a navigation program stored in the memory, the navigation program encoding the navigation method of claim 28.

\* \* \* \* \*